United States Patent
Lin et al.

(10) Patent No.: US 11,251,876 B2
(45) Date of Patent: Feb. 15, 2022

(54) OPTICAL ANALOG MATRIX MULTIPLIER FOR OPTICAL NEURAL NETWORKS

(71) Applicant: Intel Corporation, Santa Clara, CA (US)

(72) Inventors: Wenhua Lin, Fremont, CA (US); Amir Khosrowshahi, San Diego, CA (US); Casimir Wierzynski, La Jolla, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/950,819

(22) Filed: Nov. 17, 2020

(65) Prior Publication Data

US 2021/0135764 A1  May 6, 2021

(51) Int. Cl.
*H04B 10/40* (2013.01)
*H04B 10/58* (2013.01)
(Continued)

(52) U.S. Cl.
CPC ........... *H04B 10/58* (2013.01); *G02F 1/3501* (2013.01); *G06N 3/04* (2013.01); *H04B 10/40* (2013.01);
(Continued)

(58) Field of Classification Search
CPC .... H04B 10/40; H04B 10/516; H04B 10/615; G06E 3/005; G06N 3/04
See application file for complete search history.

(56) References Cited

U.S. PATENT DOCUMENTS

| 6,253,000 B1 | 6/2001 | Madsen et al. |
| 9,235,003 B2 | 1/2016 | Saida et al. |

(Continued)

FOREIGN PATENT DOCUMENTS

| CN | 110703385 A | 1/2020 |
| EP | 0933963 A2 | 8/1999 |

OTHER PUBLICATIONS

R. Jones et al., "Heterogeneously Integrated InP/Silicon Photonics", IEEE Nanotechnology Magazine, Apr. 2019, 10 pages.
(Continued)

*Primary Examiner* — Dzung D Tran
(74) *Attorney, Agent, or Firm* — Schwabe, Williamson & Wyatt, P.C.

(57) ABSTRACT

Embodiments of the present disclosure are directed toward techniques and apparatus comprising at least one layer of an ONN that includes an optical matrix multiplier provided in a semiconductor substrate to receive a plurality of optical signal inputs and to linearly transform the plurality of optical signal inputs into a plurality of optical signal outputs. The optical matrix multiplier comprises one or more 2×2 unitary optical matrices optically interconnected to implement a singular value decomposition (SVD) of a matrix, and a nonlinear optical device coupled with the optical matrix multiplier in the semiconductor substrate, to receive the optical signal outputs and to provide an optical output that is generated in a nonlinear manner in response to the optical signal outputs of the optical matrix multiplier reaching saturation or attenuation. Additional embodiments may be described and claimed.

20 Claims, 15 Drawing Sheets

(51) Int. Cl.
*G06N 3/04* (2006.01)
*G02F 1/35* (2006.01)
*H04B 10/516* (2013.01)
*H04B 10/61* (2013.01)

(52) U.S. Cl.
CPC ......... *H04B 10/516* (2013.01); *H04B 10/615* (2013.01)

(56) References Cited

U.S. PATENT DOCUMENTS

| | | | |
|---|---|---|---|
| 10,268,232 B2* | 4/2019 | Harris | G02F 1/225 |
| 10,718,906 B2 | 7/2020 | Lin | |
| 2017/0351293 A1 | 12/2017 | Carolan et al. | |
| 2019/0370652 A1* | 12/2019 | Shen | G06E 1/045 |
| 2020/0110992 A1* | 4/2020 | Hosseinzadeh | G06N 3/0472 |
| 2021/0097378 A1* | 4/2021 | Rodrigues | G06N 3/04 |

OTHER PUBLICATIONS

Non-Final Office Action dated Dec. 21, 2021 for U.S. Appl. No. 15/950,822, 14 pages.

\* cited by examiner

FIG. 11

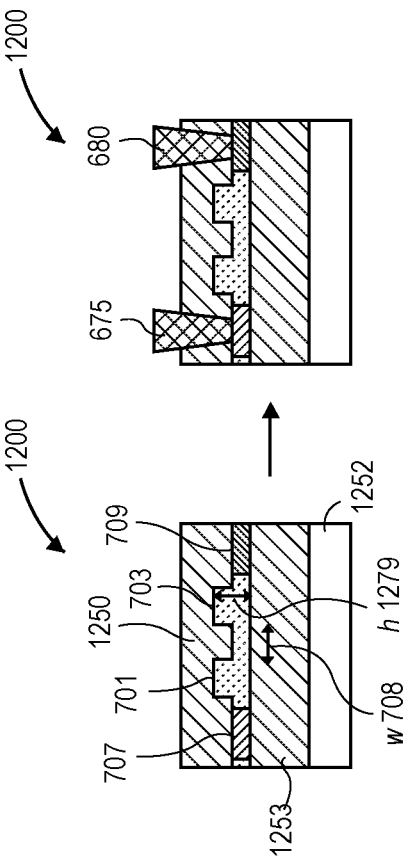
FIG. 12A
FIG. 12B
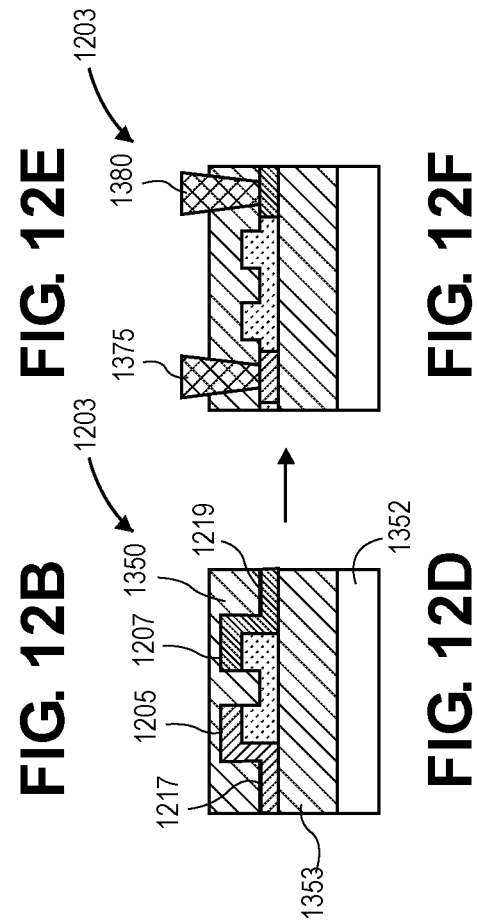
FIG. 12E
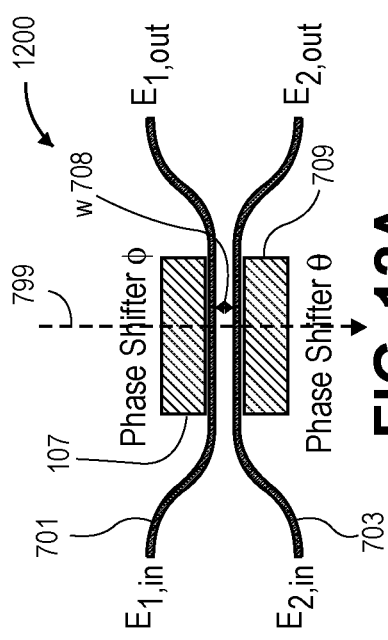
FIG. 12C
FIG. 12D
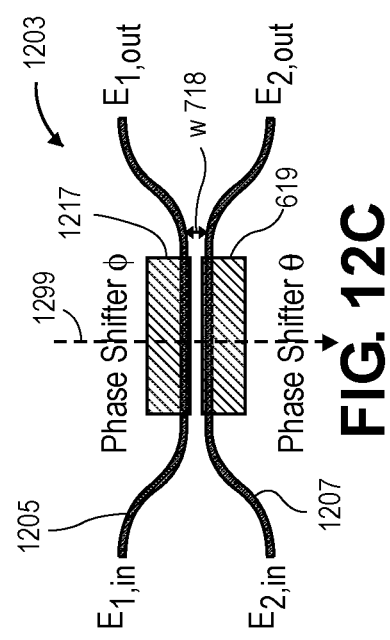
FIG. 12F

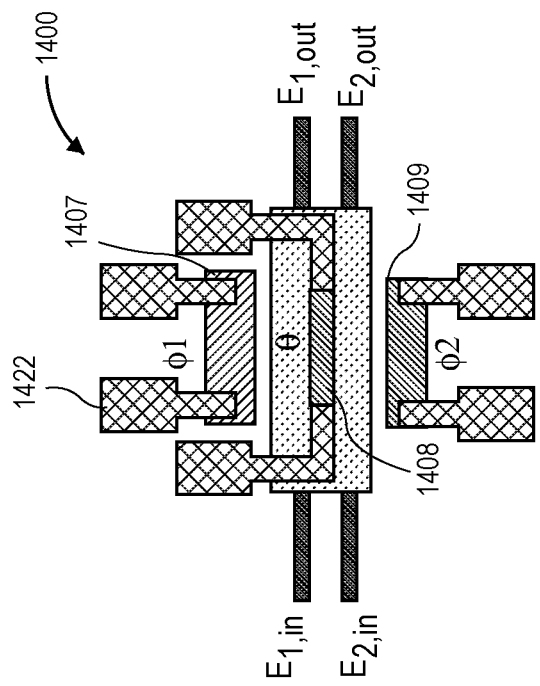
FIG. 14C
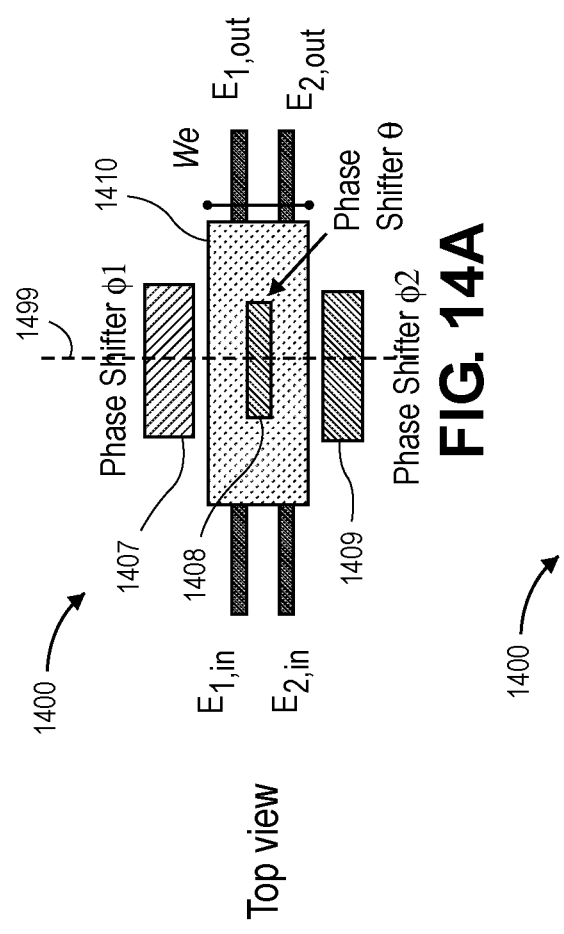
FIG. 14A
FIG. 14B

OPTICAL ANALOG MATRIX MULTIPLIER FOR OPTICAL NEURAL NETWORKS

FIELD

Embodiments of the present disclosure generally relate to the field of optoelectronics and optical neural network processors, and more particularly, to techniques and configurations for matrix multipliers for optical neural networks.

BACKGROUND

Machine learning architectures are typically based on artificial neural networks (ANNs). Traditional complementary metal oxide semiconductor (CMOS)-based ANNs may be limited in computational speed and power efficiency. Optical neural networks (ONNs) are physical implementation of ANN that use optical components as building blocks. The basic building blocks of an ONN typically include interconnected Mach-Zehnder interferometers (MZI) that perform unitary transformations on an array of optical signals.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 11 illustrates a top view of example 2×2 unitary multi-mode interference (MMI) optical couplers, having one or more of differential phase shifters and/or common phase shifters, in accordance with embodiments of the present disclosure.

FIGS. 12A-12F illustrates top views and cross-sectional views of 2×2 unitary directional optical couplers, in accordance with embodiments of the present disclosure.

FIGS. 14A-14C illustrates top views and cross-sectional views of a 2×2 unitary MMI optical coupler, in accordance with another embodiment of the present disclosure.

DETAILED DESCRIPTION

Figure 1:
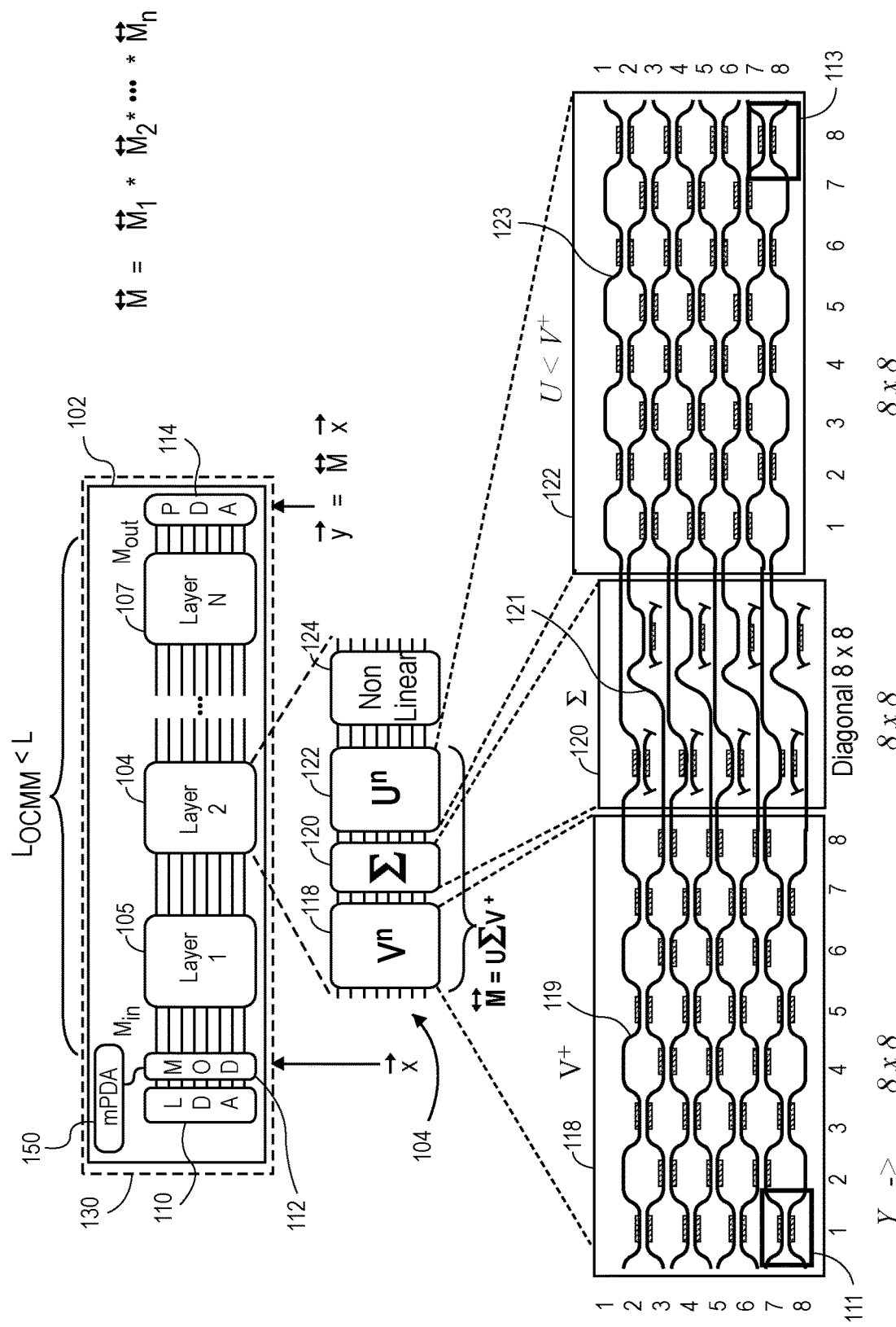
FIG. 1 shows an example of an ONN that includes layers of linear optical coherent matrix multipliers and nonlinear optical devices, in accordance with various embodiments.

Embodiments of the present disclosure describe techniques and configurations for implementing an ONN using layers of optical unitary matrix multipliers and an optical nonlinearity function implemented via nonlinear optical devices. Embodiments allow any depth and dimensions of optical unitary matrix multipliers to be implemented in the optical domain ONN. In embodiments, light flowing through the entry of an optical unitary matrix multiplier can perform a matrix multiply quickly and efficiently. In embodiments, multiple layers of optical unitary matrix multipliers may be implemented.

Embodiments may include an apparatus comprising at least one layer of an ONN that includes an optical unitary matrix multiplier provided in a semiconductor substrate to receive a plurality of optical signal inputs and to linearly transform the plurality of optical signal inputs into a plurality of optical signal outputs. The optical matrix multiplier comprises one or more 2×2 unitary optical matrices optically interconnected to implement a singular value decomposition (SVD) of a matrix. The apparatus further includes a nonlinear optical device coupled with the optical unitary matrix multiplier in the semiconductor substrate, to receive the optical signal outputs and to provide an optical output that is generated in a nonlinear manner in response to the optical signal outputs of the optical unitary matrix multiplier reaching saturation.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "optical waveguide" can refer to any physical device or structure that guides light (e.g., an optical signal) in a confined manner. In embodiments, the optical waveguides include silicon-based optical waveguides having a core for confinement of light and formation of modes surrounded by a cladding or substrate, having a lower refractive index than the core.

FIG. 1 shows an example of an ONN that includes repeating layers of linear optical coherent matrix multipliers and nonlinear optical devices, in accordance with various embodiments. In embodiments, the ONN 102 includes one or more layers 105, 104, 107. Each layer can comprise an optical matrix multiplier and nonlinear optical devices implementing optical nonlinearity function, coupled to the matrix multiplier in order to amplify and/or attenuate the output of the multiplier as needed. Such configuration allows for any depth and dimensions, implemented in the ONN. Light flowing through the entry of the ONN as described below can perform matrix multiplication quickly and efficiently, compared to conventional solutions. Multiple layers composed of the multipliers and optical nonlinear devices can be implemented in the ONN, allowing for substantial scaling up of the matrix computation for ONN. As described below, the matrix multipliers according to embodiments described herein can be scaled up from 8×8 to 256×256 or other sizes as needed.

A matrix can be written as the product of three matrices:

$$M = U\Sigma V^+$$

Where U and V are unitary transfer matrices, implemented by a series of U(2) transformations, and $\Sigma$ is a diagonal matrix with eigenvalues <1, implemented by optical attenuation.

In conventional solutions, each of three matrices can be composed of MZI elements. In the embodiments described herein, each of the matrices $U\Sigma V^+$ can be composed of 2×2 optical unitary matrix multipliers, implemented, in some embodiments, as optical couplers of various kinds, including directional couplers with phase shifters or MMI couplers with phase shifters. Various embodiments of optical couplers are described below in reference to FIGS. 7-15. Matrix multipliers composed with optical couplers described below can provide a performance of the SVD (singular value decomposition) in matrix-by-matrix multiplication or vector-by-matrix multiplication in ONN.

Returning to FIG. 1, each ONN layer 104, 105, 107 can be made up of three optical unitary matrix multipliers $V^+$ 118, $\Sigma$ 120, and U 122 that are coupled with multiple nonlinear devices 124. These optical unitary matrix multipliers 118, 120, 123 are each made up of a plurality of 2×2 optical unitary matrix multipliers 111, 113 described in reference to FIGS. 7-15). Nonlinear devices providing nonlinearity function are described further with respect to FIG. 2.

Figure 3:
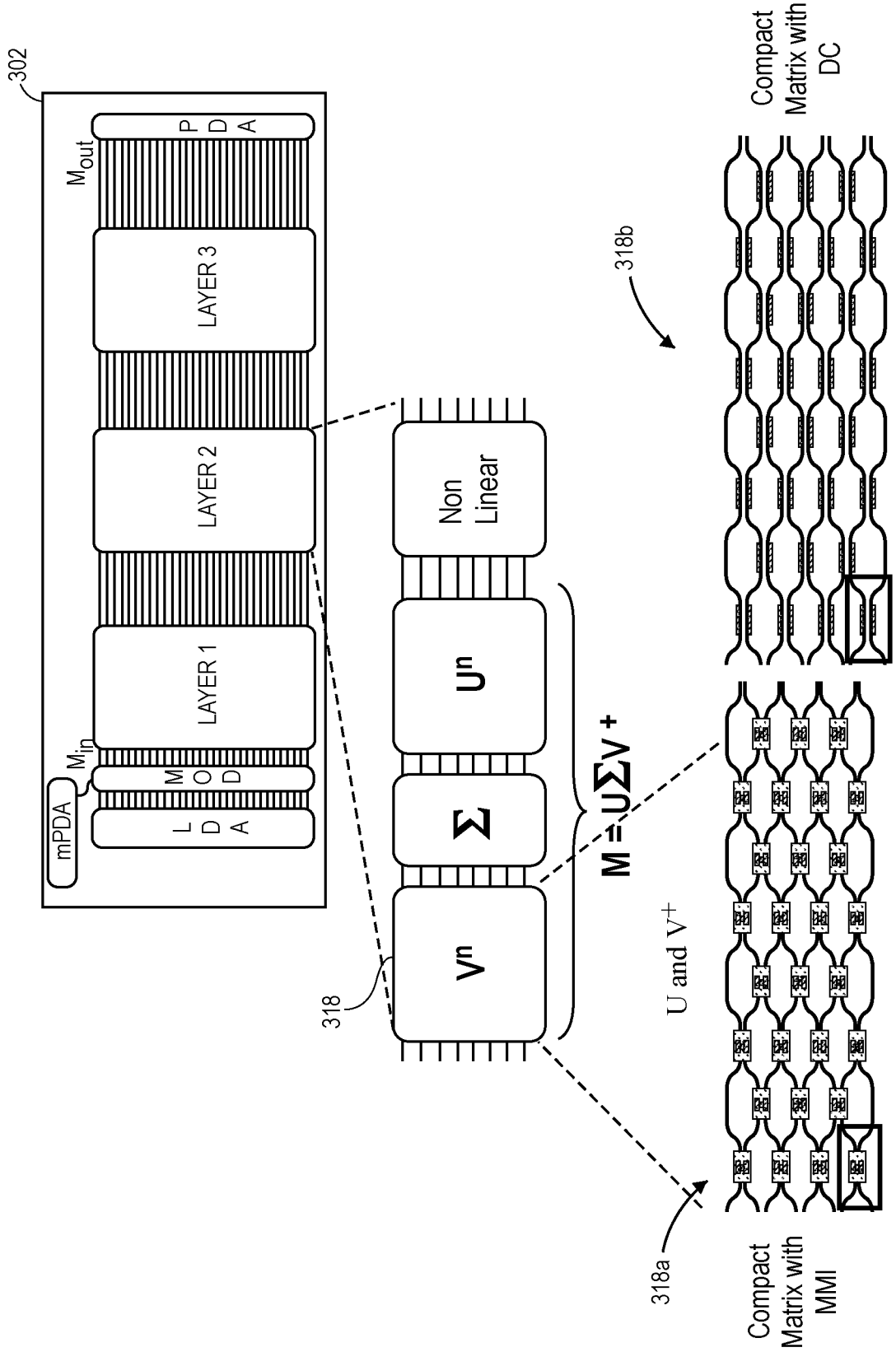
FIG. 3 illustrates example matrix multiplier implementations using optical couplers with phase shifters, in accordance with various embodiments.

As shown, ONN 102 includes a laser diode array (LDA) 110, a modulator array 112, multiple layers 105, 104, 107, and a photo detector array (PDA) 114. The monitor PDA (mPDA) 150 comprises an array of PDA at a low speed operation. A small portion of light is tapped to mPDA 150 that is used to monitor the optical link performance. The mPDA is typically implemented in every input optical signal $M_{in}$; for simplicity, FIG. 1 shows an mPDA block. Light signals generated by the LDA 110 are inputted into the modulator MOD 112. The output of the MOD 112 includes $M_{in}$ optical signal inputs inputted into layer 1 105, and subsequent layers 104 and 107. After series of transformations provided by layers 105, 104, and 107, $M_{out}$ optical signal outputs exit layer 107 and are input into PDA 114. The light signal output of the modulator 112 can be described as input vector $\vec{x}$. This input vector goes through multiple layers 105, 104, 107, each layer including optical unitary matrix multipliers $V^+$ 118, $\Sigma$ 120, and U 122 that are coupled with multiple nonlinear devices 124. As shown, at each layer, the output comprises a matrix $M_n = \beta_n \cdot U_n \Sigma V^+$, which can be described as a singular value decomposition in numerical linear algebra. Here, n is a value representing a number of the ONN layers (in FIG. 1, there are n=3 layers 105, 104, and 107). Variables U, $\Sigma$, and V are described above. $\beta$ is a nonlinearity and amplification factor corresponding to the nonlinearity function provided by the nonlinear optical devices. PDA 114 provides an output comprising an output vector $\vec{y}$ $\vec{y} = \overline{M}\vec{x}$. The sum of the matrix multiplications performed by the ONN 102 composed of n ONN layers (e.g., 104, 105, 107) can be described as $\overline{M} = \vec{M_1} * \vec{M_2} * \ldots * \vec{M_n}$, In the example of FIG. 3, each of the matrices U, $\Sigma$, and V represent 8×8 matrices. In other words, $M_{in}$=8. In the example of FIG. 3, N (number of layers) is 3, but it can be scaled up to 12 in some embodiments. Matrix U includes $M_{in}$ ($M_{in}$-1)/2 2×2 unitary optical matrices. One unitary matrix (e.g., U) can include 28 2×2 optical unitary matrix multipliers (nodes). The total number of nodes can be 168.

An important parameter in silicon photonics integration is $L_{OCMM}$, which is the total length of the optical coherent matrix multiplier, or the length of the total nodes of 2×2 optical unitary matrix multipliers (nodes). L is the photonic integrated circuit (PIC) chip length, including both $L_{OCMM}$ and the lengths of LDA, modular array and PDA. L may be less than one reticle size in Silicon wafer. For example, $L_{OCMM}$ can be about 2.4 mm or less when using compact 2×2 unitary matrix multipliers according to the described embodiments.

In some embodiments, the ONN 102 may be scaled to 32×32 size. In other words, $M_{in}$=32. Number of layers N can be provided in the range of 3 to 9 layers, but it can be scaled up to 12 in some embodiments. The matrix U each includes $M_{in}$ ($M_{in}$−1)/2 2×2 unitary optical matrices in the fully-connected nets. One unitary matrix (e.g., U) can include 496 2×2 optical unitary matrix multipliers (nodes). $L_{OCMM}$, the length of the total nodes, can be 9.6 mm or less when using compact 2×2 unitary matrix multipliers according to the described embodiments, compared to conventional solutions. The number of 2×2 optical unitary matrix multipliers nodes that can be included in one U may be 496, total number of nodes can be 2976. The ONN 102 can be provided on a single PIC chip.

In summary, each layer 104, 105, 107 of the ONN 102 can be implemented with repeating layers of linear optical coherent matrix multipliers and an optical nonlinearity function, allowing any depth and dimensions fully implemented in the optical domain ONN.

In embodiments, the ONN 102 including array (LDA) 110, modulator array 112, mPDA 150, multiple layers 105, 104, 107, and a PDA 114 can be implemented in a heterogeneously integrated photonics circuit, such as a single silicon photonics die or single semiconductor substrate 130.

Figure 2:
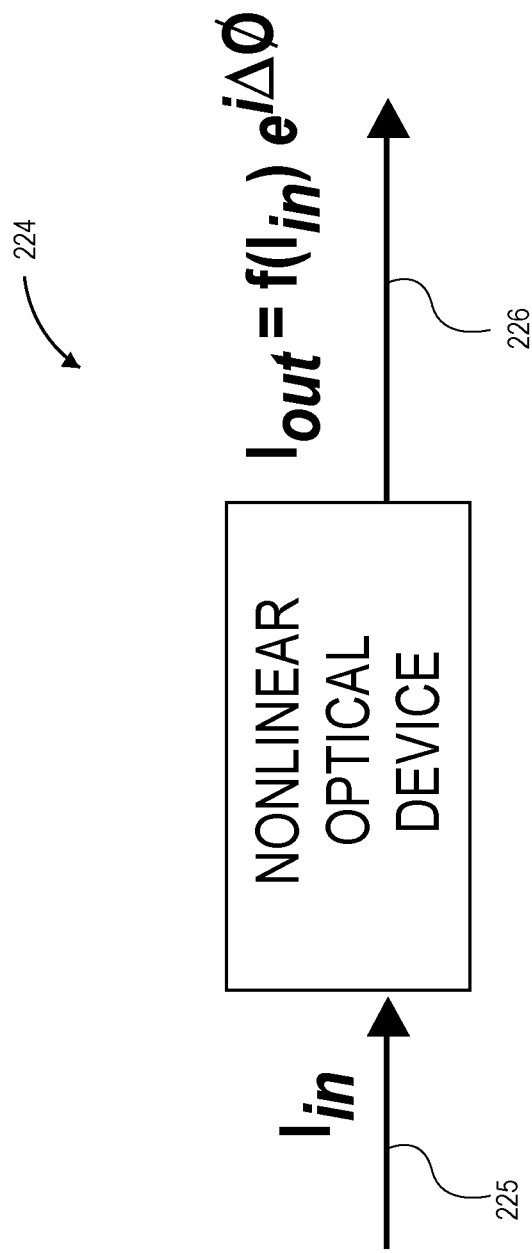
FIG. 2 shows an example nonlinear optical device used at each layer of the ONN described in reference to FIG. 1, in accordance with various embodiments.

FIG. 2 shows an example nonlinear optical device used at each layer of the ONN described in reference to FIG. 1, in accordance with various embodiments. As described above, the nonlinear optical device is provided in the ONN layers to perform nonlinearity function, e.g., amplification or attenuation of the output of the matrix multiplier.

In embodiments, the nonlinear optical device 224 may comprise multiple nonlinear optical devices (which also may be referred to as an amplifier, such as nonlinear optical device 124 of FIG. 1). During operation, an optical input signal 225 Iin (corresponding to one of the outputs of the matrix 122 of FIG. 1), which is sent into the nonlinear optical device 224, may be transformed into an optical output signal 226 Iout. The term "amplifier" is used here in a broad sense. The optical input signal 225 may need to be generated to be amplified in a linear way, amplified in a non-linear way, as well as saturated and attenuated, and/or otherwise "cleaned up" in order for the resulting optical signal output signal 226 to be more distinguishable.

The equation I out=$f(I_{in})e^{i\Delta\phi}$ on the output of 126 shown in FIG. 1 defines the overall optical signal input to optical signal output nonlinear activation function, where f is the optical intensity function of nonlinear optical device 224 as a function of optical signal input power $I_{in}$; and $\Delta\phi$ is the phase changes from optical signal input to optical signal output generated by the non-linear optical device 224. The intensity function f includes optical amplifying, saturating, rectifying and attenuating, and/or a combination of these functions, or any types of similar function to serve as optical input to optical output nonlinear activation functions. A few criteria would need in device 224. First, the optical nonlinear activation may need active feedback control to emulate the arbitrary layers matrices and to classify and predict performance. Examples of active control are bias current, voltage and/or phase tuning operation for activation functions in optical amplifying, attenuating and saturating. Second, low electrical power consumption in each optical nonlinear device is typically determined by the biasing current times the biasing voltage applied on the device 224, and it is desired low to reach power efficiency in ONNs. Third, various optical nonlinear functions f can be implemented in optical domain with associated IC driver and firmware algorithm just like various CMOS IC based nonlinear functions.

For example, if the signal output 126 level represents 8 bits, it may be desirable for the nonlinear optical device 224 to clean up the representation of a low bit to 0, and a high bit to be put into the upper limits as a saturation function. This can enhance the performance of optical signal output and enable it to propagate to the next layer in the linear functions of the various optical matrix multipliers.

As briefly described above, in embodiments, the ONN 102 may be composed of 2×2 optical unitary matrix multipliers, implemented, in some embodiments, as optical couplers of various kinds, including directional couplers with phase shifters or MMI couplers with phase shifters.

FIG. 3 illustrates example matrix multiplier implementations using optical couplers with phase shifters, in accordance with various embodiments. As shown in FIG. 3, ONN 302, which may be similar to ONN 102 of FIG. 1, includes matrices, $U\Sigma V^+$ as described above. In some embodiments, each of the matrices 318 (e.g., matrix 318a) may be composed of 2×2 optical unitary matrix multipliers, such as 2×2 unitary multi-mode interference (MMI) optical couplers, having one or more of differential phase shifters and/or common phase shifters, described in reference to FIG. 12. In some embodiments, each of the matrices 318 (e.g., matrix 318b) may be composed of 2×2 unitary directional optical couplers (DC) and/or adiabatic directional optical couplers including one or more common or differential phase shifters, described in reference to FIG. 9.

The matrix multipliers composed of 2×2 unitary matrix multipliers have substantial advantages over conventional solutions. For example, the matrix multipliers according to embodiments described herein may be scaled up to 8×8, up to 256×256 or other sizes. For example, the multipliers can be scaled up to M×M matrices, with maximum number of layers N in one reticle size in silicon wafer. For multi-pass layers ONN in FIG. 1, typically the reticle size in silicon limits the sizes of $M_{in} \times M_{out}$ and N. $L_{OCMM}$, the length of optical coherent matrix multiplier, increases as $M_{in}$ optical signal inputs, $M_{out}$ optical signal outputs, N layers all increase. $M_{in}$ can be the same as $M_{out}$, or $M_{in}$ can be different from $M_{out}$. This results in increases in PIC chip length (L) increases. L may be less than one reticle size in Silicon wafer. The matrix multipliers composed of compact 2×2 unitary matrix multipliers according to embodiments described allows larger $M_{in} \times M_{out}$ and N designed with one reticle size of silicon wafer.

In another example, the matrix multipliers can be scaled to 32×32×N, 8×8×N, with N layers ranging from 1 to 9 or larger in some embodiments. In some types of network architecture, the matrix sizes of 32 or 8 are preferred optimal matrix size for certain resolution applications. The number of layers N (referred to as "depth of network") can be selected based on silicon wafer requirement and constraints. The matrix multipliers composed of compact 2×2 unitary matrix multipliers according to embodiments described herein allow more depth N designed with one reticle size of silicon wafer.

In yet another example, the matrix multipliers can be scaled to 8×8, 16×16, 32×32, or 64×64, with N=3 layers (or larger, in some embodiments). In some types of network architecture, the number of layers N is selected for certain depth of network requirement. In such cases, the matrix multipliers can be tailored to 8×8, 16×16, 32×32, or 64×64 size, based on preferred (selected) N layers as well as the silicon wafer constraints. The matrix multipliers composed of compact 2×2 unitary matrix multipliers according to embodiments described allow larger matrix sizes for a fixed number N of layers.

Figure 4:
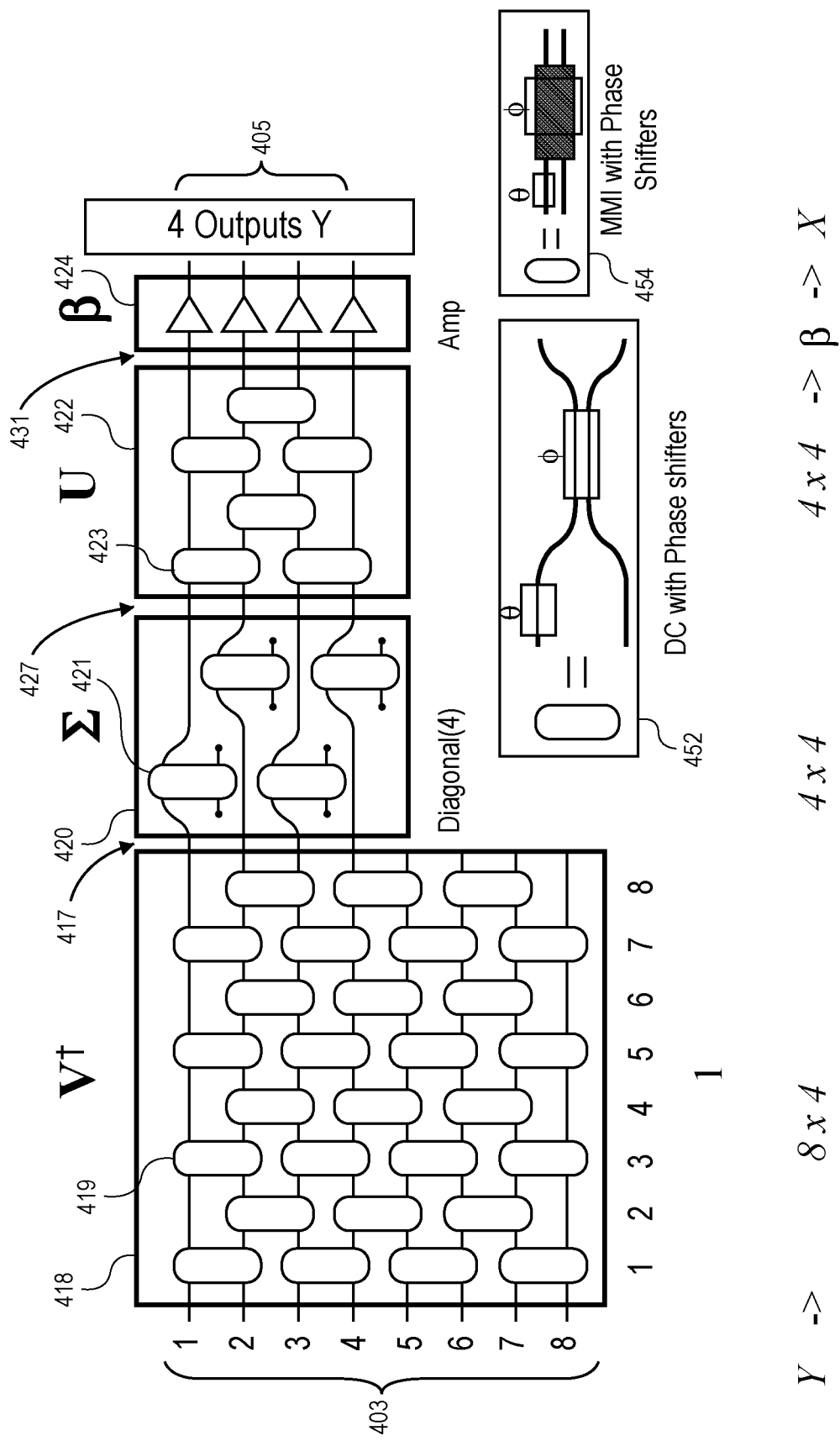
FIG. 4 shows an example of vector-by-matrix multiplication using the ONN described in FIGS. 1-3, in accordance with some embodiments.

FIG. 4 shows an example of vector-by-matrix multiplication using the ONN described in FIGS. 1-3, in accordance with some embodiments. Matrix 418, representing V, matrix 420, representing Σ and matrix 422 representing U may be similar, respectively, to matrices 118, 120, and 122 of FIG. 1. However, in the example of FIG. 4, V 418 represents an 8×4 matrix Σ 420 represents a 4×4 diagonal matrix, and U 420 represents a 4×4 matrix. Specifically, as shown, matrix V 418 has eight optical signal inputs 403 and four optical outputs 417 that are inputted into Σ 420. Σ 420 has four outputs 427, and U 420 has four outputs 431 that are inputted into the optical devices (nonlinearity function) 424 similar to the nonlinear optical device 224 of FIG. 2. Thus, the inputs 403 are transformed through matrix multiplication, as well as a nonlinear function and amplification function applied through the nonlinearity function 424, to produce four optical signal outputs 405. Light flowing from input (representing vector X) through the structure to the output (representing vector Y) can perform a matrix multiplication quickly and efficiently: Y=M X where M is $M_n = \beta_n \cdot U_n \Sigma V^+$ described above.

Matrices 418, 420, and 422 may be made up of 2×2 optical unitary matrix multipliers 419, 421, 423 respectively. As described above, 2×2 optical unitary matrix multipliers may comprise DC with phase shifters 452, or MMI with phase shifters 454.

Figure 5:
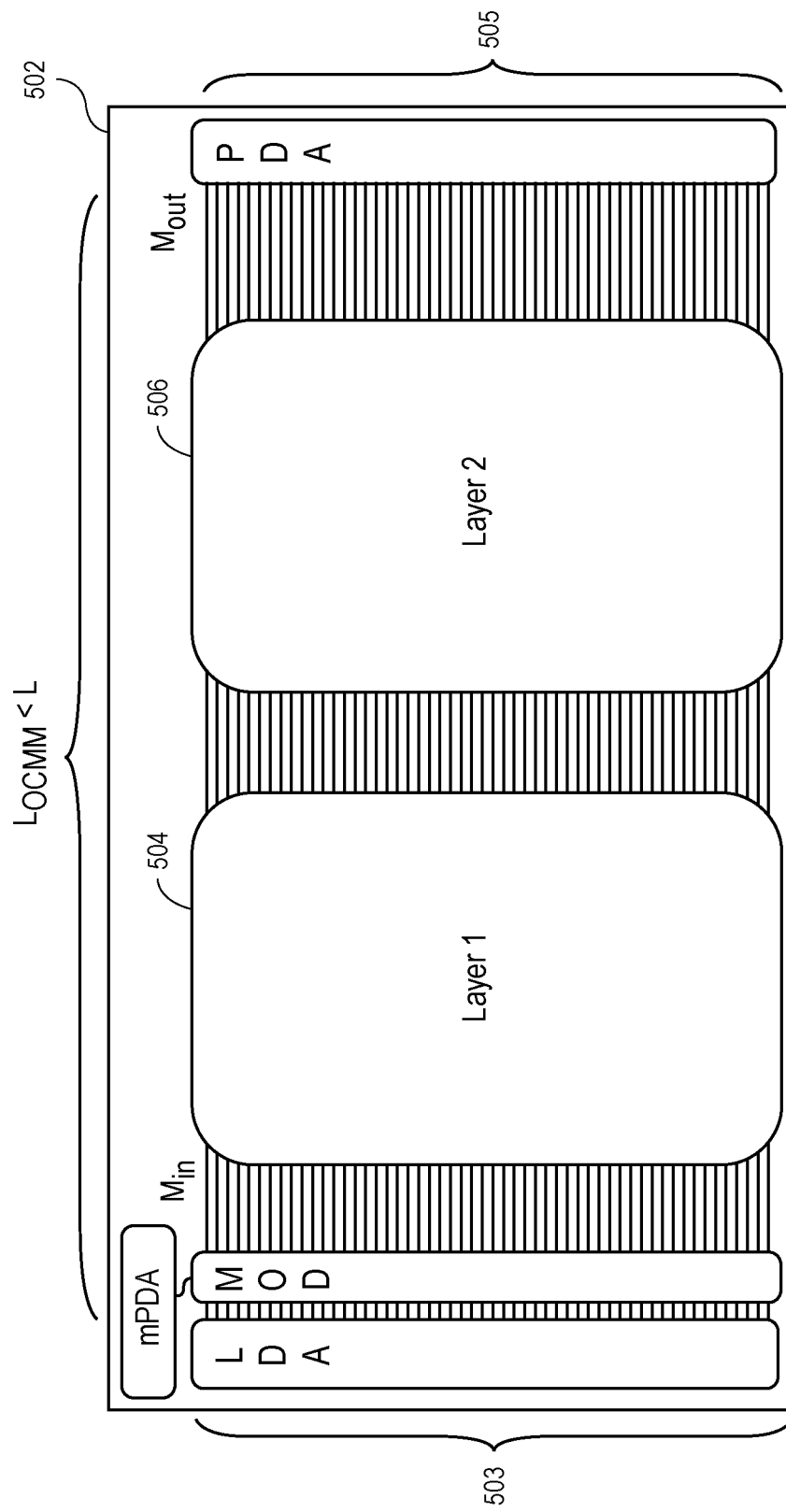
FIG. 5 shows an example of a 64 by 64 ONN, in accordance with various embodiments.

FIG. 5 shows an example of a 64 by 64 ONN, in accordance with various embodiments. ONN 502, which may be similar to ONN 102 of FIG. 1, has 64 inputs 503, and 64 outputs 505, that are transformed by passing through layer 1 504 and layer 2 506.

Each layer 504, 506 can comprise an optical unitary matrix multiplier and nonlinear optical devices implementing optical nonlinearity function, coupled to the matrix multiplier in order to amplify and/or saturate or attenuate the output of the multiplier as needed, as described with respect to FIG. 1. The ONN 502 may be scaled to 64×64 size. In other words, $M_{in}$=64 and $M_{out}$=64. The number of layers N include 2 layers 504, 506 as shown, but layers can be scaled up in embodiments. One unitary matrix (e.g., U), similar to U 122 of FIG. 1, can include a plurality of 2×2 optical unitary matrix multipliers (nodes). The total number of nodes can have a length $L_{OCMM}$ approximately 12.8 mm or less when using compact 2×2 unitary matrix multipliers according to embodiments described. There may be 2016 nodes included in one U, and the total number of nodes can be 8064. The ONN 502, similar to ONN 102, can be provided on a single PIC chip.

Figure 6:
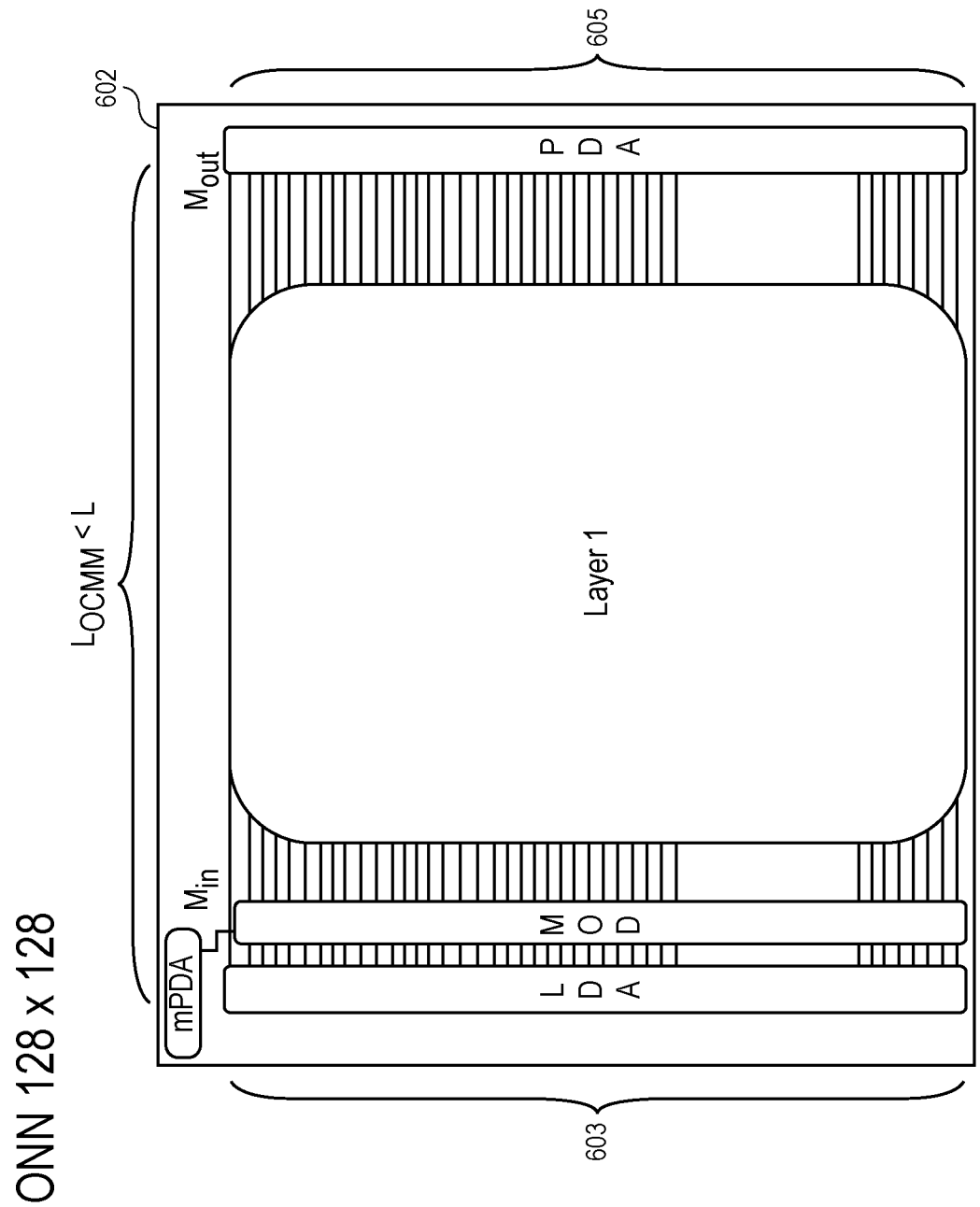
FIG. 6 shows an example of a 128 by 128 single layer ONN, in accordance with various embodiments.

FIG. 6 shows an example of a 128 by 128 single layer ONN, in accordance with various embodiments. ONN 602, which may be similar to ONN 102 of FIG. 1, has 128 inputs 603, and 128 outputs 605, that are transformed by passing through layer 1 604.

Layer 602 can comprise an optical unitary matrix multiplier and nonlinear optical devices implementing optical nonlinearity function, coupled to the matrix multiplier in order to amplify and/or saturate or attenuate the output of the multiplier as needed, as described with respect to FIG. 1. The ONN 602 may be scaled to 128×128 size. In other words, $M_{in}$=128. $M_{out}$=128. The number of layers N include one layer 604 as shown, but layers can be scaled up in embodiments. One unitary matrix (e.g., U), similar to U 122 of FIG. 1, can include a plurality of 2×2 optical unitary matrix multipliers (nodes). The total number of nodes can $L_{OCMM}$~12.8 mm less when using compact 2×2 unitary matrix multipliers according to embodiments described. $L_{OCMM}$ could be similar lengths for 64×64×2 (FIG. 5) and 128×128×1 (FIG. 6). There may be 8128 nodes included in one U, and the total number of nodes can be 16256. The ONN 602, similar to ONN 102, can be provided on a single PIC chip. Similarly 256×256×N can be implemented in the similar scheme.

As noted in reference to FIGS. 1-6, the ONNs The 2×2 optical unitary matrix multipliers that comprise the matrix multipliers described in reference to FIGS. 1-5 are described in more detail in reference to FIGS. 7-15.

Figure 7:
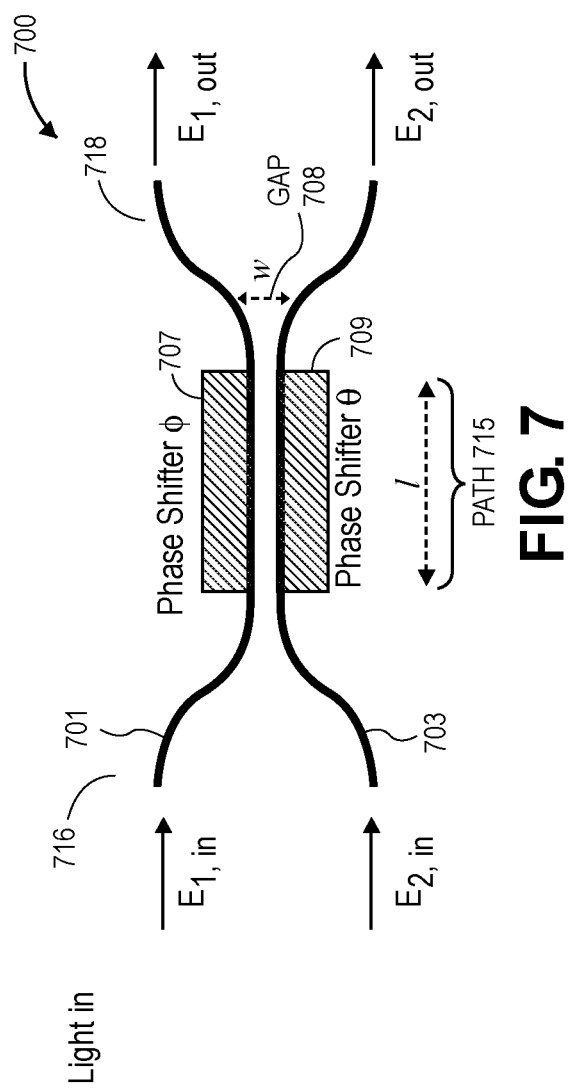
FIG. 7 illustrates an example top view of a 2×2 unitary directional optical coupler, in accordance with embodiments of the present disclosure.

FIG. 7 illustrates an example top view of a 2×2 unitary directional optical coupler 700 ("directional optical coupler 700"), in accordance with embodiments. In embodiments, a configuration of directional optical coupler 700 allows for a 2×2 optical unitary matrix multiplier that is able to perform a 2×2 unitary linear transformation on optical signals in a limited or compact space. As shown, directional optical coupler 700 includes a first optical waveguide 701 and a second optical waveguide 703. First optical waveguide 701 and second optical waveguide 703 are coupled to form a 2×2 optical unitary matrix to receive a respective first input optical signal (e.g., $E_{1,in}$) and a second input optical signal (e.g., $E_{2,in}$). As seen from FIG. 7, optical waveguide 701 and 703 form a respective first arm and a second arm that diverge at a first end (e.g., 716) and a second end (e.g., 718) and converge along a middle portion of a path (e.g., path 715). In embodiments, path 715 is a substantially parallel path. In the embodiment, path 715 includes or integrates a plurality of phase shifters, (e.g., phase shifter 707 and phase shifter 709) to assist in transforming the first optical signal or the second optical signal into a first output optical signal (e.g., $E_{1,out}$) and second output optical signal (e.g., $E_{2,out}$) to be output from the 2×2 optical unitary matrix. In embodiments, the transformation includes a combining, splitting, and phase shifting of the first input optical signal and the second input optical signal.

As will be discussed further, in embodiments, phase shifters 707 and 709 include at least one of an electro-optical induced index modulator, thermal-optics induced index modulator, or an image-spot modulator, or opto-electronic-mechanical modulator, to allow for tunable power at output waveguides. In the embodiment shown, phase shifter 707 applies a first phase shift ø and phase shifter 709 applies a second phase shift θ. As noted previously, in embodiments, directional optical coupler 700 performs a linear unitary transformation via matrix multiplication to optical input signals-(701) and -(703). For example, the transfer matrix for the directional optical coupler of FIG. 1 can be expressed as:

$$U(2) = \begin{pmatrix} \cos(\theta - \phi) & I\sin(\theta - \phi) \\ I\sin(\theta - \phi) & \cos(\theta - \phi) \end{pmatrix}$$

Note that in embodiments, path 715 has a length of or includes a critical coupling length, l, to allow the unitary transformation of optical signals in optical waveguide 701 and 703. Thus, in the embodiment, 2×2 unitary directional optical coupler 100 includes phase shifters 707 and 709 which may also serve as optical splitters and optical combiners integrated along the critical coupling length l, to respectively split or combine the first input optical signal and/or second input optical signal. In embodiments, critical coupling length l is determined to be a length to, in combination with a width of gap 708, promote or allow the first optical signal to switch from first optical waveguide 701 to the second optical waveguide 703 or vice-versa. Thus, tuning of one or more of the phase shifters causes the first input optical signal or the second input optical signal (or a portion thereof) to be switched into either of the arms to effectively form an analog switch.

As noted above in FIG. 7, optical waveguide 701 and 703 form a respective first arm and a second arm that diverge at a first end (e.g., 716) and a second end (e.g., 718) and converge along a middle portion of a path (e.g., path 715). In embodiments, path 715 is a substantially parallel path. Furthermore, note that path 715 includes a gap 708, having a width w, which runs between first optical waveguide 701 and second optical waveguide 703 along the substantially parallel path. In embodiments, the configuration of the 2×2 optical unitary matrix including the first arm and the second arm that converge to a critical coupling length l and gap 708 allow for the matrix multiplication to be performed in a limited or compact space.

Figure 8:
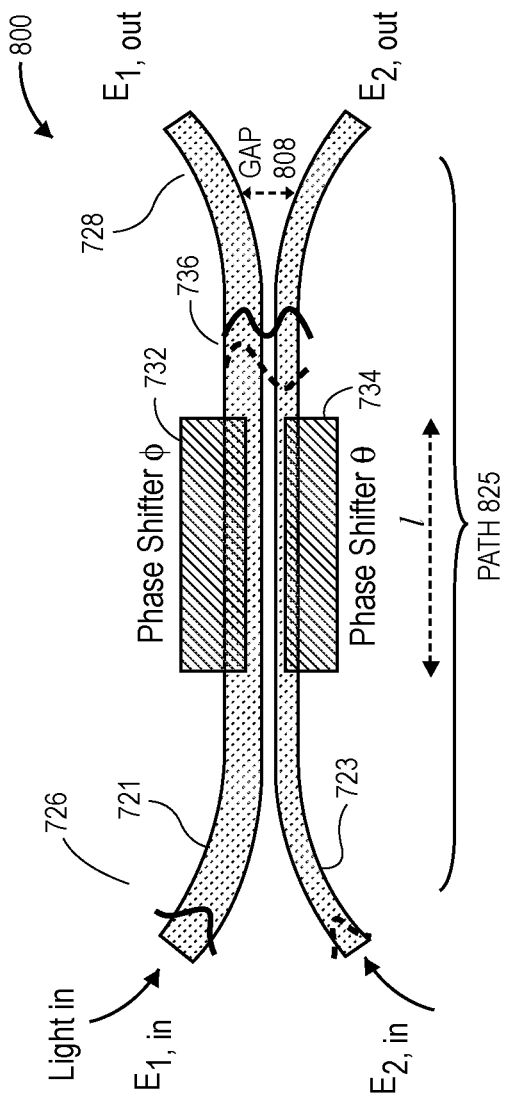
FIG. 8 illustrates an example top view of a 2×2 unitary adiabatic directional optical coupler, in accordance with embodiments of the present disclosure.

Referring now to the embodiment of FIG. 8 which illustrates an example top view of a 2×2 unitary adiabatic directional optical coupler 800. In FIG. 8, adiabatic directional optical coupler 800 includes a first optical waveguide 721 and second optical waveguide 723 evanescent coupled to form a 2×2 optical unitary matrix. In embodiments, adiabatic directional optical coupler 800, however, is formed to operate without optical loss or substantially any optical loss. In the embodiments shown, adiabatic directional optical coupler 800 is formed to include optical waveguides that have dissimilar widths or core dimension or bend diameters from each other and/or that vary in their widths or diameters along a length of an optical path that includes a plurality of phase shifters, e.g., phase shifter 732 and 734. In the embodiment, adiabatic directional optical coupler 800 receives a respective first input optical signal (e.g., $E_{1,in}$) and a second input optical signal (e.g., $E_{2,in}$) and outputs a respective first output optical signal (e.g., $E_{1out}$) and second output optical signal (e.g., $E_{2out}$). As shown, optical waveguide 721 and optical waveguide 723 converge to run alongside each other to direct the first input optical signal and the second input optical signal along optical path 825 ("path 825"). In embodiments, path 825 may include a critical coupling length, l, that may be longer or shorter than path 825, but that promotes adiabatic evanescent coupling between optical signals in optical waveguide 721 and 723.

As noted above and as shown in FIG. 8, first optical waveguide 721 has a different width or core dimension or bend diameter from second optical waveguide 723. Furthermore, in some embodiments, the width of one or more of first optical waveguide 721 and second optical waveguide 723 varies along path 825. Accordingly, directional adiabatic coupler 800 includes a first optical waveguide 721 separated from a second optical waveguide 723 by a gap 808. In embodiments, gap 808 varies in width along path 825 due to varying width of first optical waveguide 721 or second optical waveguide 723. In embodiments, gap 808 includes a width that in addition to a critical coupling length l, is determined to promote evanescent coupling (e.g., at 736) between a first input optical signal and second input optical in first optical waveguide 721 and second optical waveguide 723.

As seen in FIG. 8, optical waveguides 721 and 723 form a respective first arm and a second arm that diverge at a first end (e.g., 726) and a second end (e.g., 728) and converge along a middle portion of a substantially parallel path (e.g., path 825). Note optical waveguides 721 and 723 form a concave up or concave down shape. Note that as shown and discussed in connection with FIGS. 3 and 6 below, it is understood that a type and number of phase shifters in directional optical coupler 700 and adiabatic directional optical coupler 800 will vary.

Figure 9:
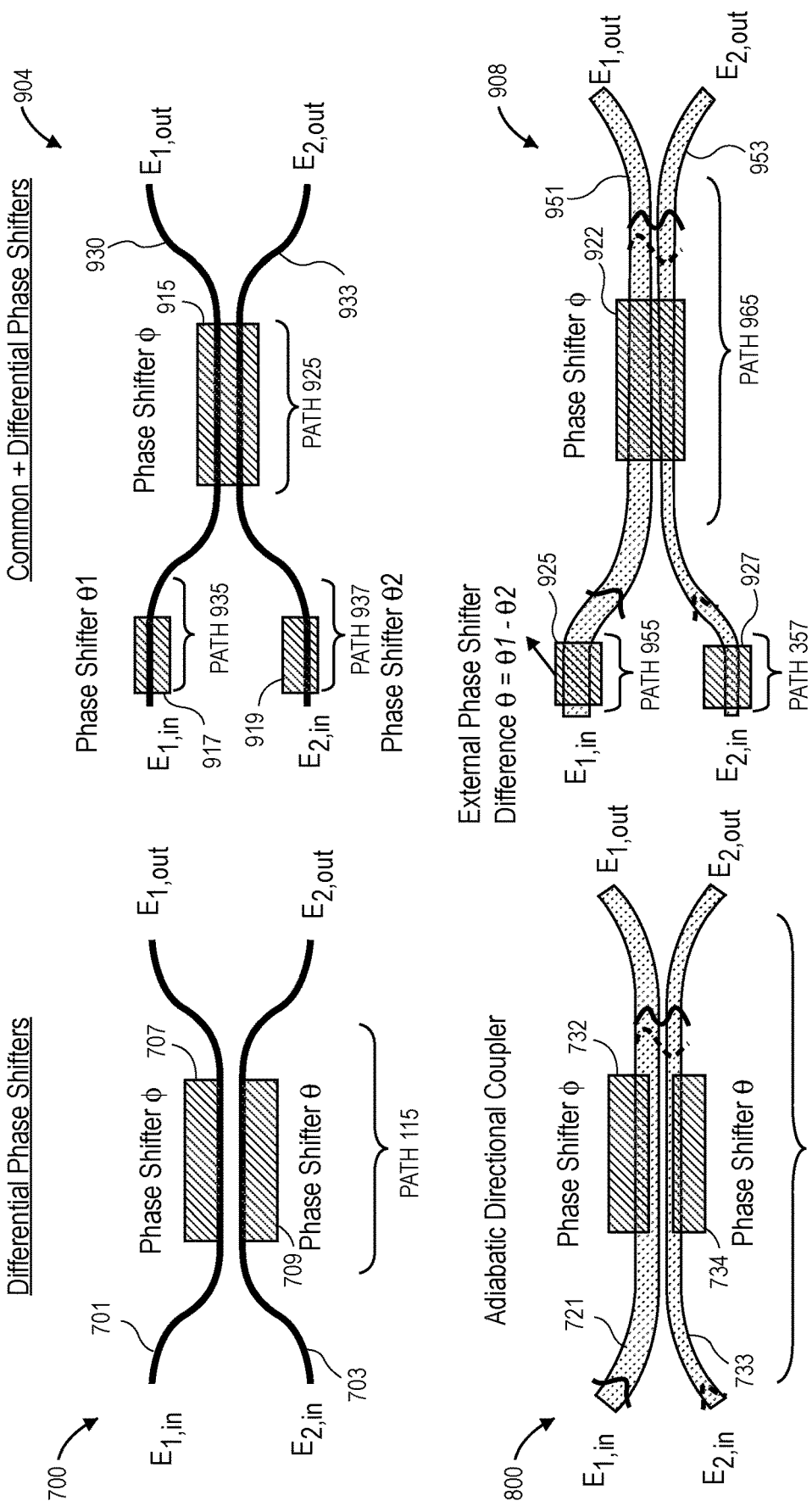
FIG. 9 illustrates an example top view of a plurality of 2×2 unitary directional optical couplers and adiabatic directional optical couplers including one or more common or differential phase shifters, in accordance with embodiments of the present disclosure.

FIG. 9 illustrates an example top view of a plurality of 2×2 unitary directional optical couplers and adiabatic directional optical couplers including one or more common or differential phase shifters, in accordance with embodiments. On a left side of FIG. 9, directional coupler 700 and adiabatic directional coupler 800 as described above in FIGS. 7 and 8 are reproduced. Note that, directional coupler 700 and adiabatic directional coupler 800 include differential phase shifters. For example, directional optical coupler 700 includes phase shifter 707 which applies a phase shift ø and phase shifter 709 which applies a phase shift θ to apply a differential phase shift (e.g., phase shift ø-phase shift θ). Similarly, adiabatic directional coupler 800 includes phase shifters 732 and phase shifter 734 to apply a differential phase shift (phase shift ø-phase shift θ) to a first input optical signal (e.g., $E_{1,in}$) and a second input optical signal (e.g., $E_{2,in}$) of adiabatic directional coupler 800.

In contrast, directional optical coupler 904 and adiabatic directional optical coupler 908 on a right side of FIG. 9 include both differential phase shifters and a common or single phase shifter that is common to both optical waveguides. As shown, directional optical coupler 904 includes a first optical waveguide 930 and a second optical waveguide 933. Common phase shifter 915 is located or integrated on a path common to each of first optical waveguide 930 and second optical waveguide 933. In contrast, external phase shifters 917 and 919 are located on paths 935 and 937 that are external to a path 925 that integrates common phase shifter 915 which implements a unitary transformation of the 2×2 unitary matrix. In the example embodiment, external phase shifters 917 and 919 of directional optical coupler 904 together apply a differential phase shift of phase shift θ1-phase shift θ2.

Similarly, in embodiments, adiabatic directional coupler 908 includes a first optical waveguide 951 and a second optical waveguide 953 including a common phase shifter 922. Common phase shifter 922 is located or integrated on a path common to each of first optical waveguide 951 and second optical waveguide 953. In contrast, external phase shifters 925 and 927 are located on paths 955 and 957 that are external to a path 965 that integrates common phase shifter 922 which implements a unitary transformation. In embodiments, external phase shifter 925 applies phase shift θ1 while external phase shifter 927 applies a phase shift of θ2 to together apply a differential phase shift of θ1-θ2.

Figure 10:
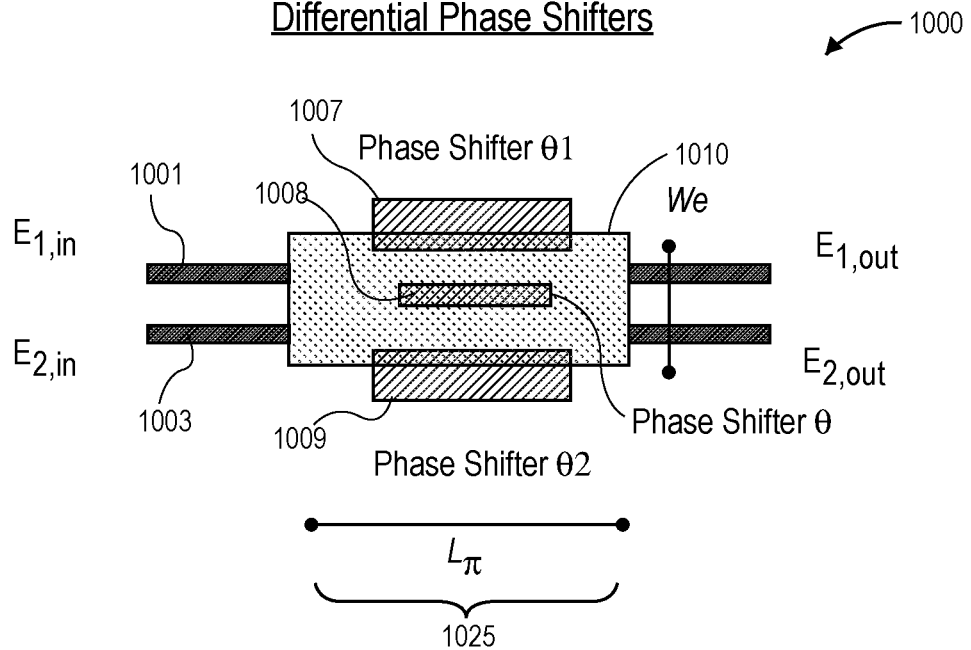
FIG. 10 illustrates a top view of two example 2×2 unitary multi-mode interference (MMI) optical couplers, in accordance with embodiments of the present disclosure.
Figure 10:
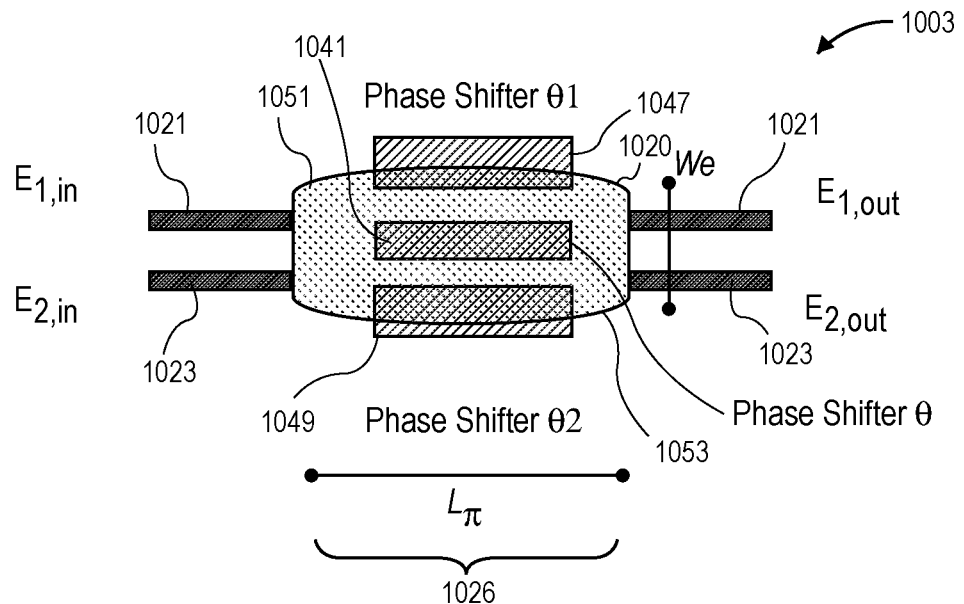

Referring now to FIG. 10 which illustrates a top view of two example 2×2 unitary multi-mode interference (MIMI) optical couplers, in accordance with embodiments. In FIG. 10, each of unitary MMI optical coupler 1000 and a unitary MIMI optical coupler 1003 include respective multi-mode (MMI) waveguide structures 1010 and 1020 that intersects an optical path. In embodiments, the MMI waveguide structures are formed such that modes of a first optical signal and modes of a second optical signal interfere with each other to assist in performing a unitary transformation of input optical signals. Note that unitary MMI optical coupler 1000 and unitary MMI optical coupler 1003 are similar to each other, with the exception of a differing shape of a bowed shape of MMI waveguide structure 1020 of unitary MMI optical coupler 1003.

As shown, unitary MMI optical coupler 1000 includes a first optical waveguide 1001 and a second optical waveguide 1003 coupled to form a 2×2 optical unitary matrix to receive a respective first input optical signal (e.g., $E_{1in}$) and a second input optical signal (e.g., $E_{2in}$). In embodiments, MMI waveguide structure 1007 has a length Lπ and a width $W_e$. Optical waveguide 401 and optical waveguide 1003 run alongside each other to direct the first input optical signal and the second input optical signal along an optical path 1025 that intersects with MMI waveguide structure 410 for length Lπ. In the embodiment, optical path 1025 includes or integrates a plurality of phase shifters to assist in performing a unitary transformation of the first optical signal and/or the second optical signal into a first output optical signal (e.g., $E_{1out}$) and second output optical signal (e.g., $E_{2out}$). In the embodiment, MMI optical coupler 1000 includes phase shifter 1007, phase shifter 1008, and phase shifter 1009 along length Lπ.

Similarly, unitary MMI optical coupler 1003 includes a first optical waveguide 1021 and a second optical waveguide 1023 coupled to form a 2×2 optical unitary matrix to receive a respective first input optical signal (e.g., $E_{1in}$) and a second input optical signal (e.g., $E_{2in}$). In the embodiment, optical path 1026 includes or integrates a plurality of phase shifters to assist in performing a unitary transformation of the first optical signal or the second optical signal into a first output optical signal (e.g., $E_{1out}$) and second output optical signal (e.g., $E_{2out}$) to be output from the 2×2 optical unitary matrix. In the embodiment, MMI optical coupler 1003 includes phase shifter 1047, phase shifter 1041, and phase shifter 1049 along length Lπ.

In embodiments, MMI waveguide structure 1020 has a length Lπ and a width $W_e$. Optical waveguide 1021 and optical waveguide 1023 run alongside each other to direct the first input optical signal and the second input optical signal along an optical path 1026 that intersects with MMI waveguide structure 1020 for length Lπ. As noted above, MMI waveguide structure 1020 has a differing shape than MMI waveguide structure 1010. In the embodiment shown, MMI waveguide structure 1020 has a curved or bowed shape along lengthwise perimeters 1051 and 1053. In embodiments, curved or bowed shape provides additional space to allow interference of the modes of the first optical input signal and a second optical input signal.

Note that, in embodiments, length Lπ of MMI optical couplers 1000 and 1003 includes a fraction or a multiple of a critical beating length Lc of the two lowest order modes with a multiple of phase shifter combination for optimal or substantially optimal phase shifter efficiency. For example, if width $W_e$ is a width of MMI optical couplers 1000 or 1003, βo is the propagation foundation of the foundational mode, β1 is the propagation constant of a first order mode, $n_r$ is effective refractive index of an optical waveguide e.g., MMI waveguide structure 1007 or 1020, and λo is the wavelength of the light, then:

$$L_c = \frac{\pi}{\beta_0 - \beta_1} \approx \frac{4 n_r W_e^2}{\beta_0 - \beta_1}$$

Note that, although MMI optical coupler 1000 and 1003 of each include three phase shifters, it is understood, that in other embodiments, the MMI optical couplers include any suitable number of phase shifters or arrangements of phase shifters to phase shift the first input optical signal and/or the second input optical signal to perform a unitary transformation. In some examples, MMI optical couplers includes successive phase shifters along the optical path including length Lπ. In some examples, the MMI optical couplers include a combination of common phase shifters and differential phase shifters as will be shown in FIG. 5. In embodiments, modes of the first optical signal and the second optical signal interfere in the MM waveguide to output an optical signal at a power ratio that can be adjusted according to unitary matrix algebra.

Figure 11:
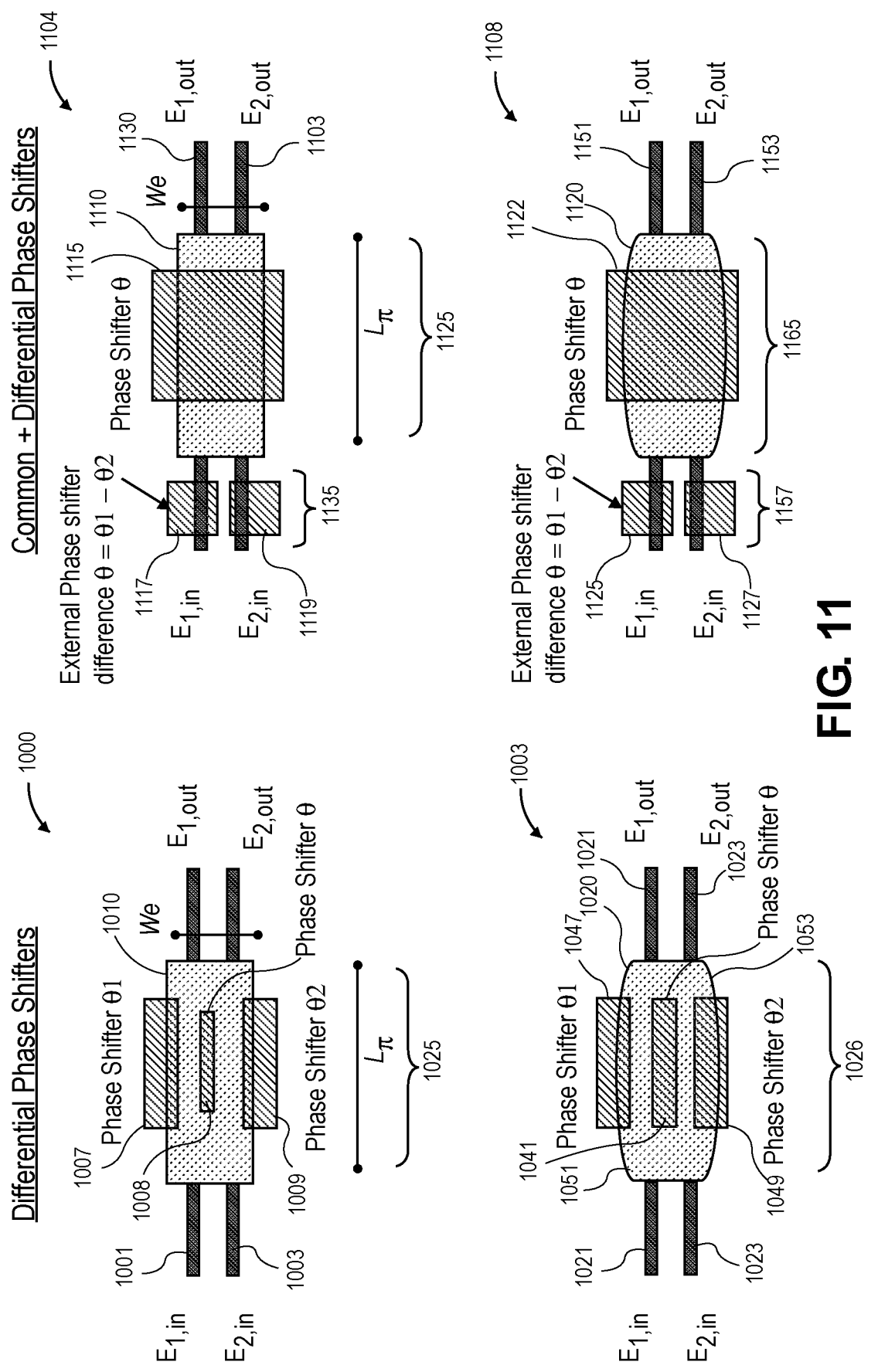

FIG. 11 illustrates a top view of example 2×2 unitary multi-mode interference (MMI) optical couplers, having differential phase shifters and/or common phase shifters. Unitary MMI optical couplers 1000 and 1003 of FIG. 10 whose elements were shown and described in connection with FIG. 10, are reproduced on a left column of FIG. 10. Thus, unitary MMI optical coupler 1000 includes phase shifter 1007 and phase shifter 1009 to apply a differential phase shift (e.g., phase shift θ1-phase shift θ2). Similarly, MMI optical coupler 1003, having curved MMI waveguide structure 1020, includes phase shifters 1047 and 1049 to apply a differential phase shift (phase shift θ1-phase shift θ2) on its respective first optical waveguide and second optical waveguide. Each of MMI optical coupler 1000 and 1003 also include respective phase shifters 1008 and 1041 to apply a phase shift θ.

Unitary MMI optical couplers 1104 and 1108 on a right side of FIG. 11 include elements similar to or the same as unitary MMI optical couplers 1000 and 1003. In contrast to unitary MMI optical couplers 1000 and 1003, however, unitary MIMI optical couplers 1104 and 1108 have differential phase shifters located external to their respective waveguide structures 1110 and 1120. In embodiments, the differential phase shifters are located or integrated on an external path (e.g., 1135 and 1157) optically coupled to the respective 2×2 unitary matrices. Unitary MMI optical couplers 1104 and 1108 each include a common phase shifter integrated within or on waveguide structures 1110 and 1120. In embodiments, common phase shifters 1115 and 1122 are located in or integrated on substantially an entire optical path along respective waveguide structures 1110 and 1120. In contrast, external phase shifters (1117, 1119 and 1125, 1127) are located on paths 1135 and 1137 that are external to optical paths 1125 and 1165 of respective waveguide structures 1110 and 1120. Note that, in embodiments, due to having both common and differential phase shifters, unitary directional optical coupler 700 may be tuned with differential and common phase control modes.

FIGS. 12-14 illustrate top and cross-sectional views of various embodiments of example 2×2 unitary directional optical couplers and 2×2 unitary MMI optical couplers. Note that in embodiments, the optical couplers are formed in crystalline silicon. Examples of waveguide materials include but are not limited to silicon, a thin silicon layer in SOI (silicon on insulator), glass, oxides, nitrides, e.g., silicon nitride, polymers, semiconductors or other suitable materials. In embodiments, waveguides in the optical couplers described in the FIGS. may be made of any medium that propagates a wavelength of light and surrounded with a cladding with a lower index of refraction. In some embodiments, waveguides may be formed on a buried oxide layer (BOX) layer of an SOI wafer with a top cladding layer over the waveguides. In embodiments, the top cladding layer includes silicon dioxide (SiO2) having an index of refraction of n=1.45, while a silicon-based waveguide has an index of refraction of, e.g., n=3.48. In embodiments, the optical couplers are formed via known lithography/etch methods associated with formation of optical waveguides on SOI wafers.

FIG. 12 illustrates top and cross-sectional views of example 2×2 unitary directional optical couplers, in accordance with embodiments of the present disclosure. FIG. 12 includes FIGS. 12A-12F. FIG. 12A illustrates unitary directional optical coupler 1200 which is the same or similar as unitary directional optical coupler 1300 shown and described in FIG. 13 (for brevity, description of some similar elements are not repeated). In embodiments, a dotted arrow 1399 represents a plane through which a cross-section of unitary directional optical coupler 1200 is shown in FIG. 12B. As shown, in FIG. 12B, first optical waveguide 1301 and second optical waveguide 1303 are single mode optical waveguide structures formed over a buried oxide layer (BOX) 1253 on a silicon on insulator (SOI) wafer 1252. In the embodiment, a top cladding layer 1250 is formed over first optical waveguide 1301 and second optical waveguide 1303. In the embodiment, phase shifter 1307 and phase shifter 1309 are formed to abut respective first optical waveguide 1301 and second optical waveguide 1303 but do not cover first optical waveguide 1301 and second optical waveguide 1303. In embodiments, an example width w of a gap 1308 between waveguides 1301 and 1303 is 0.2-0.8 micrometers (μm). In the example of FIG. 8, first optical waveguide 1301 and second optical waveguide 1303 have heights of 0.2-0.4 μm (e.g., element 1279 I FIG. 12B).

In some embodiments, after formation of phase shifters 1307 and 1309, metal connections to control a tuning of the phase shifters, using known method such as resistive thin-film strip (doped silicon, SiN) or metal wire (TiW, Tungsten) as thermal phase shifters, or doped P+ region and doped N+ region to form p-i-n junction as electro-optical phaser shifters to be introduced. For example, FIG. 12E illustrates unitary directional optical coupler 1200 after metal connections 1275 and 1280 are formed (note that similar or same elements have not been labeled for clarity in the FIGS), using known method such as passivation layer (typical oxide layer, SIN) deposition, pad opens for metal contacts and connects 1275 and 1280. In various embodiments, metal connections 1275 and 1280 may include wire bonding, bump pads, or other suitable connections, coupled to allow a tunability of phase shifters 1307 and 1309.

In another embodiment, shown in FIG. 12C is another directional optical coupler 1203. As shown, unitary directional optical coupler 1203 includes a phase shifter 1217 and phase shifter 1219 that cover at least a top portion of first optical waveguide and a second optical waveguide 1205 and 1207. In embodiments a dotted arrow 1299 represents a plane through which a cross-section of unitary directional optical coupler 1203 is shown to the right of optical coupler 1203 in FIG. 12D. As shown, phase shifters 1217 and 1219 are formed over a buried oxide layer (BOX) 1353 over a silicon on insulator (SOI) wafer 1352. A top cladding layer 1350 is shown above phase shifters 1217 and 1219. As noted above, phase shifters 1217 and 1219 are formed to cover at least a portion of respective first optical waveguide 1205 and second optical waveguide 1207.

After formation of phase shifters 1217 and 1219, metal connections to control a tuning of the phase shifters are formed. For example, FIG. 12F illustrates unitary directional optical coupler 1200 after metal connections 1375 and 1380 are formed (note that similar or same elements have not been labeled for clarity in the FIGS). In various embodiments, metal connections 1375 and 1380 may include wire bonding, bump pads, or other suitable connections, to allow a tunability of phase shifters 1217 and 1219.

In embodiments, phase shifter 1307 and phase shifter 1309 are PN-diode-based phase shifters or thermal based phase shifters. Note that in other embodiments, phase shifters 1217 and 1219 may cover varying portions of first optical waveguide 1205 and second optical waveguide 1207.

Figure 13C:
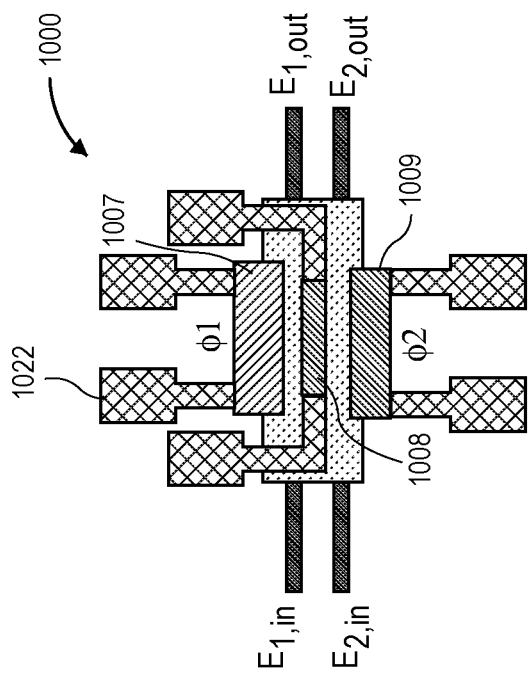
FIGS. 13A-13C illustrates top views and cross-sectional views of a 2×2 unitary MMI optical coupler, in accordance with embodiments of the present disclosure.
Figure 13A:
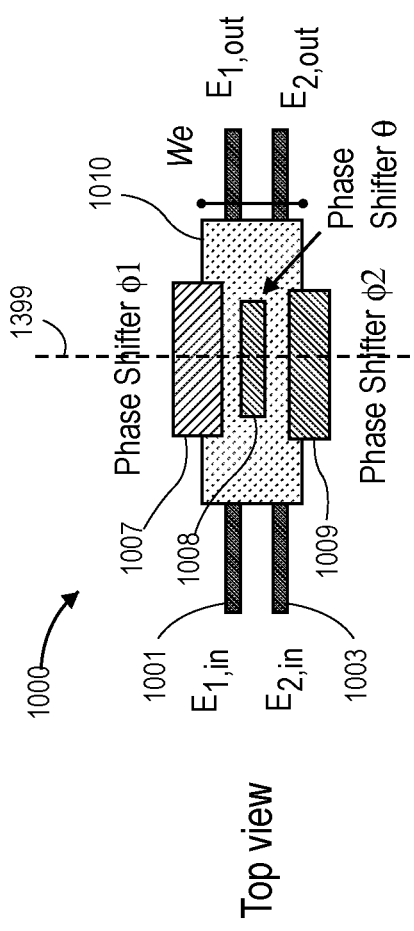
Figure 13B:
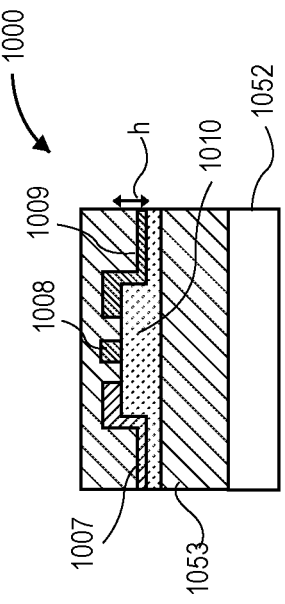

FIG. 13 illustrates top and cross-sectional views of a 2×2 unitary MMI optical coupler, in accordance with embodiments of the present disclosure. FIG. 13 includes FIGS. 13A-13C and illustrates embodiments associated with a methods of forming phase shifters of a unitary MMI optical coupler. FIG. 13A illustrates a unitary MMI optical coupler similar to as shown and described in FIG. 10 (note that description of similar elements may not be repeated). In embodiments a dotted arrow 1399 represents a plane through which a cross-section of unitary MMI optical coupler 1000 is shown in FIG. 13B. As seen in FIG. 13B, unitary MMI optical coupler 1000 is formed over a buried oxide layer (BOX) 1053 on a silicon on insulator (SOI) wafer 1052. In embodiments, phase shifters 1007 and 1009 are formed to cover at least a portion of MMI waveguide structure 1010. In some embodiments, MMI waveguide structure 1010 is a waveguide that is wide compared to, e.g., first optical waveguide 1001 and second optical waveguide 1003, and includes a width $W_e$ of, for example, 2-10 μm and a height h of 0.2-0.4 μm. In the embodiment, additional phase shifter 1008 is formed over (or integrated above) MMI waveguide structure 1010. After formation of the phase shifters, metal connections to control a tuning of the phase shifters are formed. For example, FIG. 13C illustrates MMI optical coupler 1000 after metal connections 1022 are formed. In various embodiments, metal connections 1022 may include wire bonding or bump pads coupled to tunable phase shifters of MMI optical coupler 1000. Although six metal connections are shown, only metal connection 1022 is labeled for clarity in the figures.

Note that a tuning allows the modes of the first optical signal and the second optical signal interfere in the MINI waveguide to output an optical signal at a power ratio that can be adjusted according to a U(2) matrix algebra.

FIG. 14 illustrates top views and cross-sectional views of another 2×2 unitary MMI optical coupler, in accordance with another embodiment of the present disclosure. FIG. 14 includes FIGS. 14A-14C which are associated with a method of forming phase shifters in a unitary MMI optical coupler. FIG. 14A shows a top view of a unitary MMI optical coupler similar to that of FIG. 13 and FIG. 10, with the exception that a first and a second phase shifter are formed next to MMI waveguide structure 1410 (rather than covering a portion of MMI waveguide structure 1410). In FIG. 14A, a dotted arrow 1499 represents a plane through which a cross-section of a unitary MMI optical coupler 1400 is shown in FIG. 14B. As seen in FIG. 14B, unitary MMI optical coupler 1400 is formed over a buried oxide layer (BOX) 1453 on a silicon on insulator (SOI) wafer 1452. In embodiments, phase shifters 1407 and 1409 are formed next to MMI waveguide structure 1410. In the embodiment shown, a third, or additional phase shifter 1408 is formed over (or integrated above) MMI waveguide structure 1410.

After formation of the phase shifters, metal connections to control a tuning of the phase shifters 1407-1409 are formed. For example, FIG. 14C illustrates MMI optical coupler 1400 after metal connections 1422 are formed. In various embodiments, metal connections 1422 may include wire bonding or bump pads coupled to tunable phase shifters 1407, 1408, and 1409 of MMI optical coupler 1400. Although six metal connections are shown, only metal connection 1422 is labeled for clarity in the figures.

Note that phase shifters 1007-1009 and 1407-1408 of FIGS. 13 and 14 may include any suitable type of phase shifter such as, but not limited to, PN junction diode phase shifters or thermal heater phase shifters. Furthermore, as noted previously, a number and configuration of phase shifters may vary. For example, in various embodiments, a plurality of phase shifters may be integrated on MMI waveguide structure 1010 or 1410 in a successive arrangement (not shown).

Figure 15:
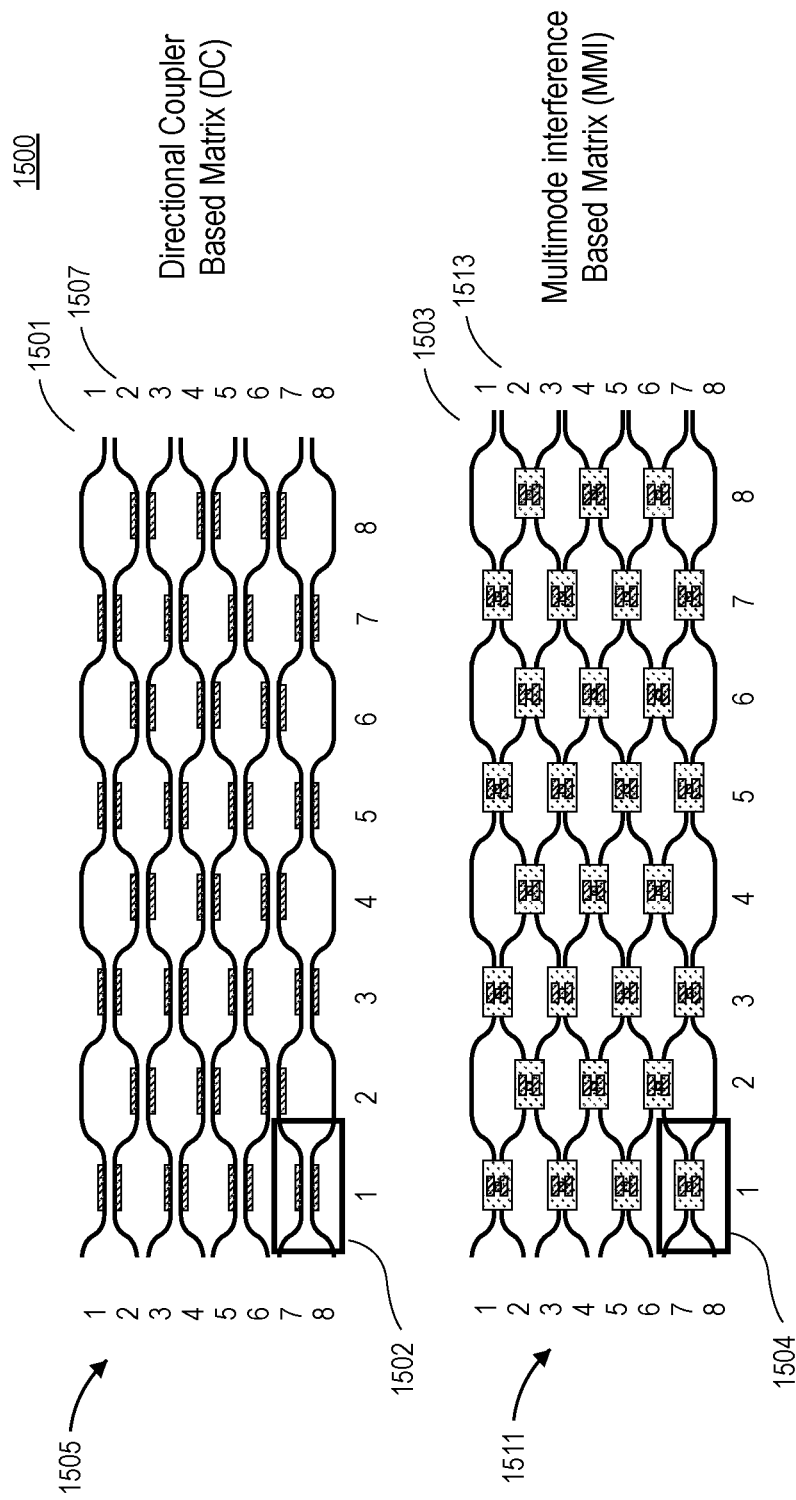
FIG. 15 illustrates a matrix multiplier that includes a plurality of 2×2 unitary directional optical matrices and an optical unitary matrix that includes a plurality of 2×2 unitary multi-mode interference (MMI) optical couplers, in accordance with other embodiments of the present disclosure.

FIG. 15 illustrates a matrix multiplier that includes a plurality of 2×2 unitary directional optical matrices and an optical unitary matrix that includes a plurality of 2×2 unitary MMI optical couplers, in accordance with other embodiments of the present disclosure. More specifically, FIG. 15 illustrates examples of a first matrix multiplier and a second matrix multiplier having a plurality of optical unitary matrices coupled together. In embodiments, the unitary optical matrices are coupled together to form matrix multipliers having a plurality of n optical inputs and a plurality of n optical outputs. In embodiments, the plurality of 2×2 unitary optical matrices are optically coupled to receive an array of optical signal inputs and to linearly transform the plurality of optical signal inputs into an array of optical signal outputs, wherein each of the plurality of 2×2 unitary optical matrices include a first optical waveguide and a second optical waveguide coupled to converge and diverge along an optical path.

In embodiments, matrix multiplier 1501 is a larger unitary optical matrix that includes a plurality of 2×2 unitary directional optical matrices 1502 (e.g., similar or the same as directional optical coupler 1300 of FIG. 13) while matrix multiplier 1503 includes a plurality of 2×2 unitary multi-mode interference (MMI) optical couplers 1504 (e.g., similar or the same as example 2×2 unitary MMI optical couplers of FIG. 10). Note that for clarity in the FIG., only one of 2×2 directional optical matrices 1502 and one of 2×2 unitary multi-mode interference (MMI) optical couplers 1504 is labeled. For matrix multiplier 1501, a plurality of 2×2 directional optical matrices 1502 are optically coupled together to receive an array of optical signal inputs at 1505 in FIG. 14 and to linearly transform the plurality of optical signal inputs into an array of optical signal outputs 1507. Similarly, for matrix multiplier 1503, a plurality of unitary multi-mode interference (MMI) optical couplers 1504 are coupled together to receive an array of optical signal inputs at 1511 to linearly transform the plurality of optical signal inputs into an array of optical signal outputs 1507.

Note that in various embodiments, the matrix multipliers include any of, or any suitable combination of different types of 2×2 optical matrices such as, the 2×2 unitary directional optical couplers and 2×2 unitary MMI optical couplers as described and shown in previous FIGS. 7-14. For example, in various embodiments, the matrix multipliers include a plurality of 2×2 unitary adiabatic directional optical couplers such as the 2×2 unitary adiabatic directional optical coupler of FIG. 8, 2×2 unitary directional optical couplers and adiabatic directional optical couplers having one or more common or differential phase shifters of FIG. 9, or 2×2 unitary multi-mode interference (MMI) optical couplers having one or more of differential phase shifters and/or common phase shifters of FIG. 11.

Note that the array of optical signal inputs 1505 for matrix multiplier 1501 (and optical signal inputs 1511 for matrix multiplier 1503) include n optical inputs and n optical signal outputs where n=8. In embodiments, the matrix multipliers each include n (n−1)/2 2×2 unitary optical matrices (e.g., n (n−1)/2 2×2 optical matrices). Although n=8 in FIG. 15 for both matrix multiplier 1501 and 1503, it should be understood that 8 is only an example and n is any number of optical inputs and optical outputs suitable for an application. In embodiments, n is 2, 4, 8, 16, 32, 64, 128, or 256. It is further understood that couplings as in matrix multiplier 1501 and 1503 have been simplified in order to conceptually illustrate optical connections between 2×2 directional optical matrices 1502 or unitary multi-mode interference (MMI) optical couplers 1504. The matrix multiplier can have n optical inputs and m output outputs, n may be not equal to m where n, m=2, 3, 8, 16, 32, 64, 128 or 256, and it include n (m−1)/2 2×2 unitary optical matrices.

Accordingly, as described in connection with FIGS. 8-14, each of 2×2 directional optical matrices 1502 and 2×2 unitary multi-mode interference (MMI) optical couplers 1504 each include a first optical waveguide and a second optical waveguide coupled along an optical path. Furthermore, for the embodiments, a plurality of tunable optical phase shifters (e.g., as described in connection with FIGS. 13-14) are included along the optical path of each of the first optical waveguide and the second optical waveguide in each of the plurality of 2×2 unitary optical matrices to phase shift an optical beam to linearly transform the array of optical signal inputs into the array of optical signal outputs.

Figure 16:
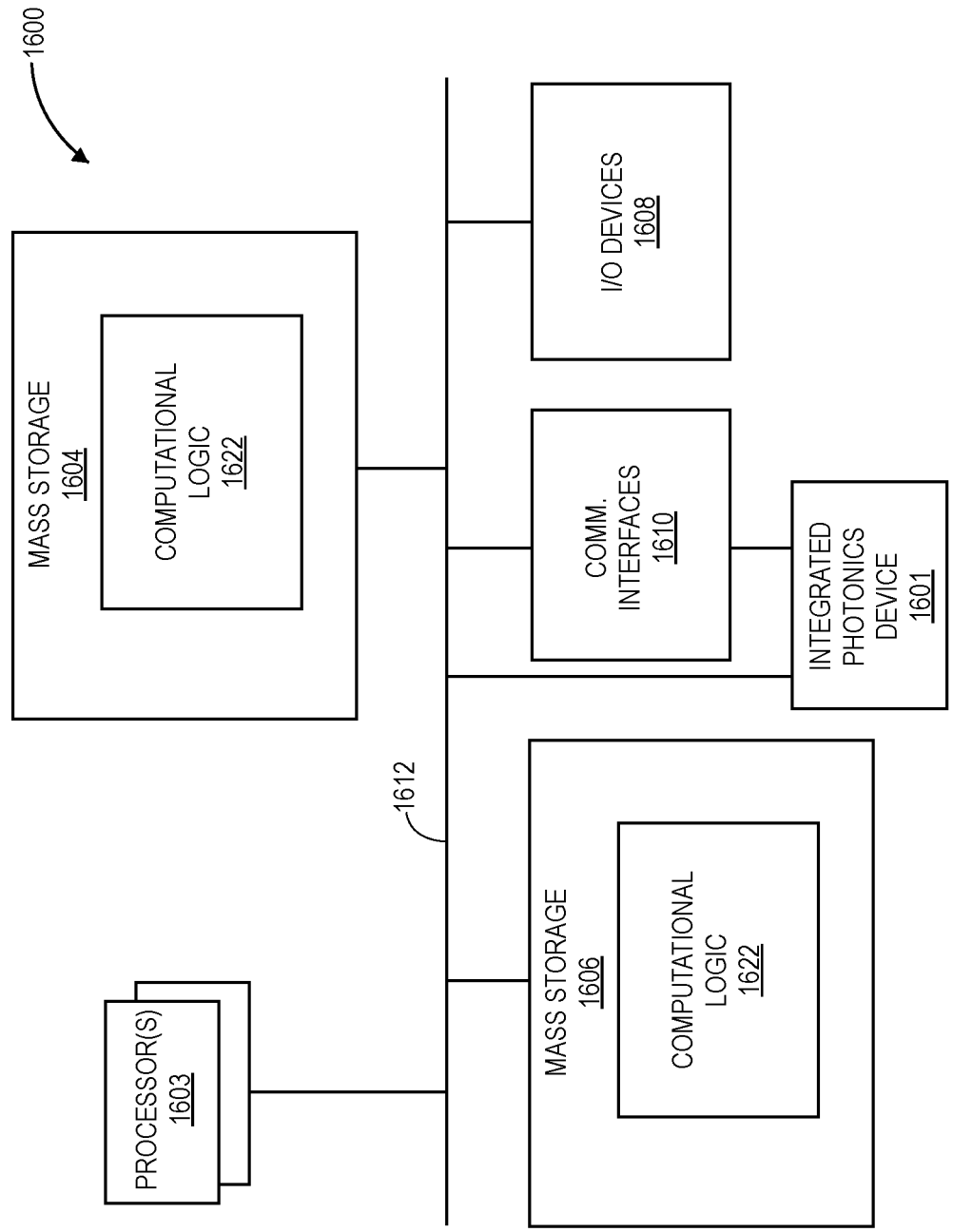
FIG. 16 illustrates a computing device provided with an ONN in accordance with various embodiments.

FIG. 16 illustrates a computing device provided with an ONN in accordance with various embodiments. Specifically, FIG. 16 illustrates an example computing device 1600 suitable for use with an integrated photonics device 1601 (e.g., similar to or the same as ONN 102 of FIG. 1 or devices of FIGS. 5-6) in accordance with various embodiments as described herein. In embodiments, integrated photonics device 1601 includes an optical neural network (ONN) integrated circuit (IC) including an array of light sources and an optical unitary matrix multiplier in a semiconductor substrate. In embodiments, the array of light sources generates an array of light signals and integrated photonics device 1601 further includes an integrated plurality of optical modulators to receive the array of light signals and modulate data onto the array of light signals and provide optical signal inputs to the optical unitary matrix multiplier. In embodiments, the optical unitary matrix multiplier linearly transforms the plurality of optical signal inputs into an array of optical signal outputs. In embodiments, a processor coupled to the ONN IC provides the ONN with the data to modulate onto the array of optical signal inputs to be transformed by the optical unitary matrix multiplier.

In embodiments, the device 1601) may include or be used in general matrix multiplier (GEMM) or convolutional (CONV) neural network accelerators, heterogeneous artificial intelligence (AI) media inferencing accelerators, domain-specific machine-learning and deep learning accelerators (Neuro/Memory/inferencing/training), or data-centric neural network computing processors.

For example, as shown, computing device 1600 may include a one or more processors or processor cores 1603 and memory 1604. In some embodiments, the device 1601 may be integrated with the processors 1603. In embodiments, memory 1604 may be system memory. For the purpose of this application, including the claims, the terms "processor" and "processor cores" may be considered synonymous, unless the context clearly requires otherwise. The processor 1603 may include any type of processors, such as a central processing unit, a microprocessor, and the like. The processor 1603 may be implemented as an integrated circuit having multi-cores, e.g., a multi-core microprocessor. The computing device 1600 may include mass storage devices 1606 (such as diskette, hard drive, volatile memory (e.g., dynamic random-access memory (DRAM), compact disc read-only memory (CD-ROM), digital versatile disk (DVD), and so forth). In general, memory 1604 and/or mass storage devices 1606 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth.

The computing device 1600 may further include input/output (I/O) devices 1608 (such as a display (e.g., a touchscreen display), keyboard, cursor control, remote control, gaming controller, image capture device, and so forth) and communication interfaces 1610 (such as network interface cards, modems, infrared receivers, radio receivers (e.g., Bluetooth), and so forth). In some embodiments, the communication interfaces 1610 may include or otherwise be coupled with integrated photonics device 1601, as described above, in accordance with various embodiments.

The communication interfaces 1610 may include communication chips that may be configured to operate the device 1600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1610 may operate in accordance with other wireless protocols in other embodiments.

The above-described computing device 1600 elements may be coupled to each other via system bus 1612, which may represent one or more buses. In the case of multiple buses, they may be bridged by one or more bus bridges (not shown). Each of these elements may perform its conventional functions known in the art. In particular, memory 1604 and mass storage devices 1606 may be employed to store a working copy and a permanent copy of the programming instructions for the operation of integrated photonics device. The various elements may be implemented by assembler instructions supported by processor(s) 1603 or high-level languages that may be compiled into such instructions.

The permanent copy of the programming instructions may be placed into mass storage devices 1606 in the factory, or in the field through for example, a distribution medium (not shown), such as a compact disc (CD), or through communication interface 1610 (from a distribution server (not shown)). That is, one or more distribution media having an implementation of the agent program may be employed to distribute the agent and to program various computing devices.

The number, capability, and/or capacity of the elements 1608, 1610, 1612 may vary, depending on whether computing device 1600 is used as a stationary computing device, such as a server computer in a data center, or a mobile computing device, such as a tablet computing device, laptop computer, game console, or smartphone. Their constitutions are otherwise known, and accordingly will not be further described.

For one embodiment, at least one of processors 1603 may be packaged together with computational logic 1622 configured to practice aspects of optical signal transmission and receipt described herein to form a System in Package (SiP) or a System on Chip (SoC).

In various implementations, the computing device 1600 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1600 may be any other electronic device that processes data.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

According to various embodiments, the present disclosure describes a number of examples.

Example 1 is an apparatus for an optical neural network (ONN), comprising: at least one layer of the ONN that includes: an optical matrix multiplier provided in a semiconductor substrate to receive a plurality of optical signal inputs and to linearly transform the plurality of optical signal inputs into a plurality of optical signal outputs, wherein the optical matrix multiplier comprises one or more 2×2 unitary optical matrices optically interconnected to implement a singular value decomposition (SVD) of a matrix; and a nonlinear optical device coupled with the optical matrix multiplier in the semiconductor substrate, to receive the optical signal outputs and to provide an optical output that is generated in a nonlinear manner in response to the optical signal outputs of the optical matrix multiplier reaching saturation.

Example 2 includes the apparatus of Example 1, further comprising: an array of light sources provided in the semiconductor substrate to generate an array of light signals; and a plurality of optical modulators coupled to the array of light sources in the semiconductor substrate to modulate data onto the light signals to generate the array of optical signal inputs, to be provided to the optical matrix multiplier.

Example 3 includes the apparatus of Example 1, wherein the one or more 2×2 unitary optical matrices comprise a 2×2 optical coupler, wherein the 2×2 optical coupler includes one of: a 2×2 unitary direction optical coupler with one or more phase shifters, a 2×2 unitary adiabatic directional optical coupler with one or more phase shifters, or a multi-mode interference (MMI) optical coupler with one or more phase shifters.

Example 4 includes the apparatus of Example 1, wherein the semiconductor substrate is a single semiconductor substrate and the array of light sources, the plurality of optical modulators, and the optical matrix multiplier are heterogeneously integrated in the single semiconductor substrate.

Example 5 includes the apparatus of Example 1, wherein the optical matrix multiplier that comprises one or more 2×2 unitary optical matrices optically interconnected to implement a singular value decomposition (SVD) of a matrix includes a unitary matrix U, a diagonal matrix Σ, and a unitary matrix V.

Example 6 includes the apparatus of Example 5, wherein the matrix U is an 8×8 matrix with 8 inputs and 8 outputs, wherein the matrix Σ is an 8×8 diagonal matrix, wherein the matrix V is an 8×8 matrix, and wherein the at least one layer of the ONN comprises at least three layers.

Example 7 includes the apparatus of Example 5, wherein the optical matrix multiplier provides a vector-by-matrix multiplication, wherein the matrix U is an 8×8 matrix with 8 inputs and 4 outputs, wherein the matrix Σ is an 4×4 diagonal matrix, wherein the matrix V is a 4×4 matrix, and wherein the at least one layer of the ONN comprises at least three layers.

Example 8 includes the apparatus of Example 1, wherein the optical matrix multiplier comprises one of: an 8×8, 16×16, 32×32, or 64×64 matrix, wherein the at least one layer of the ONN comprises at least three layers; a 32×32×N or 8×8×N, wherein N is a number of layers of the ONN comprising at least one layer; or a 128×128 or a 256×256 matrix, wherein the at least one layer of the ONN comprises one layer.

Example 9 includes the apparatus of Example 1, further comprising an array of photodetectors coupled to detect the attenuated, saturated or amplified optical signal outputs and provide the amplified optical output to analog to digital conversion (ADC) circuitry.

Example 10 includes the apparatus of Example 1, wherein the nonlinear optical device is to provide at least one of: amplification, saturation, rectification, or attenuation of the optical output.

Example 11 is an optical neural network (ONN) integrated circuit (IC), comprising: an array of light sources in a semiconductor substrate to generate an array of light signals; a plurality of optical modulators coupled to the light sources to modulate data onto the array of light signals to generate a plurality of optical signal inputs; an optical matrix multiplier provided in a semiconductor substrate to linearly transform the plurality of optical signal inputs into a plurality of optical signal outputs, wherein the optical matrix multiplier comprises one or more 2×2 unitary optical matrices optically interconnected to implement a singular value decomposition (SVD) of a matrix; and a nonlinear optical device coupled with the optical unitary matrix multiplier in the semiconductor substrate, to provide an optical output that is generated in a nonlinear manner in response to the optical signal outputs of the optical unitary matrix multiplier reaching saturation or attenuation.

Example 12 includes the ONN IC of Example 11, wherein the array of light sources, the plurality of optical modulators, and the optical matrix multiplier are integrated in the semiconductor substrate.

Example 13 includes the ONN IC of Example 11, wherein the one or more 2×2 unitary optical matrices comprise a 2×2 optical coupler, wherein the 2×2 optical coupler includes one of: a 2×2 unitary direction optical coupler with one or more phase shifters, a 2×2 unitary adiabatic directional optical coupler with one or more phase shifters, or a multi-mode interference (MIMI) optical coupler with one or more phase shifters.

Example 14 includes the ONN IC of Example 11, further comprising an array of photodetectors coupled with the nonlinear optical device to detect the optical output and provide the optical output to analog to digital conversion (ADC) circuitry.

Example 15 includes the ONN IC of Example 11, wherein the optical matrix multiplier that comprises one or more 2×2 unitary optical matrices optically interconnected to implement a singular value decomposition (SVD) of a matrix includes a unitary matrix U, a diagonal matrix Σ, and a unitary matrix V.

Example 16 includes the ONN IC of Example 15, wherein the matrix U is an 8×8 matrix with 8 inputs and 8 outputs, wherein the matrix Σ is an 8×8 matrix, wherein the matrix V is an 8×8 matrix, and wherein the at least one layer of the ONN comprises 3 to 12 layers.

Example 17 includes the ONN IC of Example 15, wherein the optical matrix multiplier provides a vector-by-matrix multiplication, wherein the matrix U is an 8×8 matrix with 8 inputs and 4 outputs, wherein the matrix Σ is an diagonal 4×4 matrix, wherein the matrix V is a 4×4 matrix, and wherein the at least one layer of the ONN comprises at least three layers.

Example 18 is a computing device comprising: a processor; and an optical neural network (ONN) apparatus, coupled with the processor, to receive data from the processor, wherein the ONN apparatus includes: an optical matrix multiplier to receive an array of optical signal inputs modulated with the data and to linearly transform the plurality of optical signal inputs into an array of optical signal outputs, wherein the optical matrix multiplier comprises one or more 2×2 unitary optical matrices optically interconnected to implement a singular value decomposition (SVD) of a matrix; and a nonlinear optical device coupled with the optical matrix multiplier in the semiconductor substrate, to provide an optical output that is generated in a nonlinear manner in response to the optical signal outputs the optical matrix multiplier reaching saturation.

Example 19 includes the computing device of Example 18, wherein the one or more 2×2 unitary optical matrices comprise a 2×2 optical coupler, wherein the 2×2 optical coupler includes one of: a 2×2 unitary direction optical coupler with one or more phase shifters, a 2×2 unitary adiabatic directional optical coupler with one or more phase shifters, or a multi-mode interference (MMI) optical coupler with one or more phase shifters.

Example 20 includes the computing device of Example 18, wherein the ONN apparatus comprises an integrated circuit.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An apparatus for an optical neural network (ONN), comprising:
at least one ONN layer of the ONN that includes:
an optical matrix multiplier provided in a semiconductor substrate to receive a plurality of optical signal inputs and to linearly transform the plurality of optical signal inputs into a plurality of optical signal outputs, wherein the optical matrix multiplier comprises one or more 2×2 unitary optical matrices optically interconnected to implement a singular value decomposition (SVD) of a matrix; and
a nonlinear optical device coupled with the optical matrix multiplier in the semiconductor substrate, to receive the optical signal outputs and to provide an optical output that is generated in a nonlinear manner in response to the optical signal outputs of the optical matrix multiplier reaching saturation.

2. The apparatus of claim 1, further comprising:
an array of light sources provided in the semiconductor substrate to generate an array of light signals; and
a plurality of optical modulators coupled to the array of light sources in the semiconductor substrate to modulate data onto the light signals to generate the array of optical signal inputs, to be provided to the optical matrix multiplier.

3. The apparatus of claim 1, wherein the one or more 2×2 unitary optical matrices comprise a 2×2 optical coupler, wherein the 2×2 optical coupler includes one of: a 2×2 unitary directional optical coupler with one or more phase shifters, a 2×2 unitary adiabatic directional optical coupler with one or more phase shifters, or a multi-mode interference (MMI) optical coupler with one or more phase shifters.

4. The apparatus of claim 2, wherein the semiconductor substrate is a single semiconductor substrate and the array of light sources, the plurality of optical modulators, and the optical matrix multiplier are heterogeneously integrated in the single semiconductor substrate.

5. The apparatus of claim 1, wherein the optical matrix multiplier that comprises one or more 2×2 unitary optical matrices optically interconnected to implement a singular value decomposition (SVD) of a matrix includes a unitary matrix U, a diagonal matrix Σ, and a unitary matrix V.

6. The apparatus of claim 5, wherein the matrix U is an 8×8 matrix with 8 inputs and 8 outputs, wherein the matrix Σ is an 8×8 diagonal matrix, wherein the matrix V is an 8×8 matrix, and wherein the at least one ONN layer comprises at least three layers.

7. The apparatus of claim 5, wherein the optical matrix multiplier provides a vector-by-matrix multiplication, wherein the matrix U is an 8×8 matrix with 8 inputs and 4 outputs, wherein the matrix Σ is an 4×4 diagonal matrix, wherein the matrix V is a 4×4 matrix, and wherein the at least one ONN layer comprises at least three layers.

8. The apparatus of claim 1, wherein the optical matrix multiplier comprises one of:
an 8×8, 16×16, 32×32, or 64×64 matrix, wherein the at least one ONN layer comprises at least three layers;
a 32×32×N or 8×8×N, wherein N is a number of layers of the ONN comprising the at least one ONN layer; or
a 128×128 or a 256×256 matrix, wherein the at least one ONN layer comprises one layer.

9. The apparatus of claim 1, further comprising an array of photodetectors coupled to detect the attenuated, saturated or amplified optical signal outputs and provide the amplified optical output to analog to digital conversion (ADC) circuitry.

10. The apparatus of claim 1, wherein the nonlinear optical device is to provide at least one of: amplification, saturation, rectification, or attenuation of the optical output.

11. An optical neural network (ONN) integrated circuit (IC), comprising:
an array of light sources in a semiconductor substrate to generate an array of light signals;
a plurality of optical modulators coupled to the light sources to modulate data onto the array of light signals to generate a plurality of optical signal inputs; and
one or more ONN layers provided in a semiconductor substrate, wherein each layer of the one or more ONN layers is optically coupled with at least one other ONN layer of the one or more ONN layers, and each ONN layer includes:
an optical matrix multiplier to linearly transform the plurality of optical signal inputs into a plurality of optical signal outputs, wherein the optical matrix multiplier comprises one or more 2×2 unitary optical matrices optically interconnected to implement a singular value decomposition (SVD) of a matrix, and
a nonlinear optical device coupled with the optical matrix multiplier in the semiconductor substrate, to provide an optical output that is generated in a nonlinear manner in response to the optical signal outputs of the optical matrix multiplier reaching saturation or attenuation.

12. The ONN IC of claim 11, wherein the array of light sources, the plurality of optical modulators, and the optical matrix multiplier are integrated in the semiconductor substrate.

13. The ONN IC of claim 11, wherein the one or more 2×2 unitary optical matrices comprise a 2×2 optical coupler, wherein the 2×2 optical coupler includes one of: a 2×2 unitary direction optical coupler with one or more phase shifters, a 2×2 unitary adiabatic directional optical coupler with one or more phase shifters, or a multi-mode interference (MMI) optical coupler with one or more phase shifters.

14. The ONN IC of claim 11, further comprising an array of photodetectors coupled with the nonlinear optical device to detect the optical output and provide the optical output to analog to digital conversion (ADC) circuitry.

15. The ONN IC of claim 11, wherein the optical matrix multiplier that comprises one or more 2×2 unitary optical matrices optically interconnected to implement a singular value decomposition (SVD) of a matrix includes a unitary matrix U, a diagonal matrix Σ, and a unitary matrix V.

16. The ONN IC of claim 15, wherein the matrix U is an 8×8 matrix with 8 inputs and 8 outputs, wherein the matrix Σ is an 8×8 matrix, wherein the matrix V is an 8×8 matrix, and wherein the one or more ONN layers comprises 3 to 12 layers.

17. The ONN IC of claim 15, wherein the optical matrix multiplier provides a vector-by-matrix multiplication, wherein the matrix U is an 8×8 matrix with 8 inputs and 4 outputs, wherein the matrix Σ is an diagonal 4×4 matrix, wherein the matrix V is a 4×4 matrix, and wherein the one or more ONN layers comprises at least three layers.

18. A computing device comprising:
 a processor; and
 an optical neural network (ONN) apparatus, coupled with the processor, to receive data from the processor, wherein the ONN apparatus includes a plurality of ONN layers, wherein each ONN layer of the plurality of ONN layers comprises:
  an optical matrix multiplier to receive a plurality of optical signal inputs modulated with the data and to linearly transform the plurality of optical signal inputs into an array of optical signal outputs, wherein the optical matrix multiplier comprises one or more 2×2 unitary optical matrices optically interconnected to implement a singular value decomposition (SVD) of a matrix; and
  a nonlinear optical device coupled with the optical matrix multiplier in a semiconductor substrate, to provide an optical output that is generated in a nonlinear manner in response to the optical signal outputs of the optical matrix multiplier reaching saturation.

19. The computing device of claim 18, wherein the one or more 2×2 unitary optical matrices comprise a 2×2 optical coupler, wherein the 2×2 optical coupler includes one of: a 2×2 unitary direction optical coupler with one or more phase shifters, a 2×2 unitary adiabatic directional optical coupler with one or more phase shifters, or a multi-mode interference (MMI) optical coupler with one or more phase shifters.

20. The computing device of claim 18, wherein the ONN apparatus comprises an integrated circuit.

* * * * *